US011029266B2

(12) United States Patent
Asgari et al.

(10) Patent No.: US 11,029,266 B2
(45) Date of Patent: Jun. 8, 2021

(54) ANALYSIS OF ANTIMICROBIAL COATINGS USING XRF

(71) Applicant: Allied Bioscience, Inc., Plano, TX (US)

(72) Inventors: Parham Asgari, Arlington, TX (US); Jie Fang, Carrollton, TX (US); Gavri Grossman, Dallas, TX (US); Maha El-Sayed, Fremont, CA (US)

(73) Assignee: ALLIED BIOSCIENCE, INC., Plano, TX (US)

( * ) Notice: Subject to any disclaimer, the term of this patent is extended or adjusted under 35 U.S.C. 154(b) by 0 days.

(21) Appl. No.: 16/749,343

(22) Filed: Jan. 22, 2020

(65) Prior Publication Data

US 2020/0240935 A1     Jul. 30, 2020

Related U.S. Application Data

(60) Provisional application No. 62/796,821, filed on Jan. 25, 2019, provisional application No. 62/902,102, filed on Sep. 18, 2019.

(51) Int. Cl.
    *G01N 23/223*     (2006.01)
    *G01B 15/02*     (2006.01)

(52) U.S. Cl.
    CPC .......... *G01N 23/223* (2013.01); *G01B 15/02* (2013.01); *G01N 2223/076* (2013.01); *G01N 2223/601* (2013.01); *G01N 2223/61* (2013.01); *G01N 2223/632* (2013.01); *G01N 2223/633* (2013.01)

(58) Field of Classification Search
None
See application file for complete search history.

(56) References Cited

U.S. PATENT DOCUMENTS

| | | | |
|---|---|---|---|
| 6,641,829 B1 * | 11/2003 | Green | A01N 25/34 |
| | | | 28/100 |
| 7,430,274 B2 | 9/2008 | Connors et al. | |
| 9,606,048 B2 | 3/2017 | Kumar et al. | |
| (Continued) | | | |

FOREIGN PATENT DOCUMENTS

| | | | | |
|---|---|---|---|---|
| CN | 100405904 C | * | 7/2008 | ............ D06M 11/70 |
| WO | WO-2004038087 A2 | * | 5/2004 | ............ D06M 16/00 |
| (Continued) | | | | |

OTHER PUBLICATIONS

ISA; International Preliminary Report on Patentability dated Oct. 22, 2020 in PCT/US2020/014561.
(Continued)

*Primary Examiner* — Thomas R Artman
(74) *Attorney, Agent, or Firm* — Snell & Wilmer L.L.P

(57) ABSTRACT

A method of quantifying an antimicrobial coatings using a handheld XRF analyzer is disclosed. The method provides an estimate of the expected level of antimicrobial efficacy for a thin film comprising silicon and/or titanium by obtaining a $_{14}$Si or $_{22}$Ti peak intensity using XRF spectroscopy and converting the obtained $_{14}$Si or $_{22}$Ti peak intensity to the expected level of efficacy using a calibration curve. A properly calibrated handheld XRF analyzer allows a user to assess the viability of antimicrobial coatings in the field, such as in a hospital where various fomites may be coated with silane and/or titanium compositions.

15 Claims, 17 Drawing Sheets

(56) References Cited

U.S. PATENT DOCUMENTS

| | | | | |
|---|---|---|---|---|
| 9,777,201 | B2* | 10/2017 | Widger | .................. C09J 175/16 |
| 10,150,899 | B2* | 12/2018 | Widger | .................. C09J 175/06 |
| 2009/0129541 | A1 | 5/2009 | Ong et al. | |
| 2014/0187413 | A1 | 7/2014 | Lagaron | |
| 2017/0022403 | A1 | 1/2017 | Widger et al. | |
| 2017/0150723 | A1 | 6/2017 | Moros et al. | |
| 2017/0362479 | A1* | 12/2017 | Widger | .................. C09J 175/06 |
| 2020/0240935 | A1* | 7/2020 | Asgari | .................. G01B 15/02 |

FOREIGN PATENT DOCUMENTS

| WO | WO-2004038087 A3 * | 7/2004 | ............ D06M 16/00 |
|---|---|---|---|
| WO | 2007074166 | 7/2007 | |

OTHER PUBLICATIONS

ISA; International Search Report and Written Opinion dated Mar. 20, 2020 in PCT/US2020/014561.

ISA; Written Opinion dated Jul. 24, 2020 in PCT/US2020/014561.

ISA; Invitation to Pay Additional Fees dated Oct. 21, 2020 in PCT/US2020/014561.

Thorn et al., Use of a Bioluminescent Pseudomonas aeruginosa Strain within an In Vitro Microbiological System, as a Model of Wound Infection, to Assess the Antimicrobial Efficacy of Wound Dressings by Monitoring Light Production, Antimicrobial Agents and Chemotherapy, vol. 51, No. 9, Sep. 2007 (retrieved on Mar. 9, 2020). Retrieved from the Internet: <URL: https://aac.asm.org/content/51/9/3217>. pp. 3217-3224.

* cited by examiner

| | SS304-BG | SS316-BG | BRASS464-BG | BRASS260-BG | Al1100-BG | Al2024-BG | Zn-BG | Cu-BG | Ti-BG |
|---|---|---|---|---|---|---|---|---|---|
| SLOPE | 3309 | 3485 | 5082 | 5245 | 5763 | 5876 | 5917 | 5592 | 5592 |
| BG | 506 | 254 | 18 | 11 | 137 | 61 | 22 | 7 | 39 |
| SLOPE/BG | 7 | 14 | 277 | 477 | 42 | 96 | 269 | 860 | 143 |
| $R^2$ | 0.9982 | 0.9992 | 0.9992 | 0.9995 | 0.9988 | 0.9994 | 0.9984 | 0.9955 | 0.9955 |

ANALYSIS OF ANTIMICROBIAL COATINGS USING XRF

CROSS-REFERENCE TO RELATED APPLICATIONS

This application claims priority to and the benefit of U.S. Provisional Patent Application Ser. No. 62/796,821 filed Jan. 25, 2019, entitled "Analysis of Antimicrobial Coatings using XRF," and U.S. Provisional Patent Application Ser. No. 62/902,102 filed Sep. 18, 2019, entitled "Analysis of Antimicrobial Coatings using XRF." The '821 and '102 applications are incorporated herein by reference in their entireties for all purposes.

FIELD

The present disclosure generally relates to analytical measurements using X-ray fluorescence (XRF) spectrometry, and more specifically to systems and methods for analyzing antimicrobial coatings on surfaces using a handheld XRF analyzer.

BACKGROUND

In general, it is inherently difficult to quantify thickness and composition of thin films coated on surfaces. For example, a large or permanently fixed surface (e.g., a countertop) cannot be physically brought to an analytical laboratory for surface analysis. In other examples, the difference in weight between an uncoated and coated surface may be undetectable or statistically unreliable, particularly if the surface is considerably heavy in weight and the thin film coating is correspondingly miniscule in weight, which is often the situation.

Various analytical methods such as atomic force microscopy (AFM), X-ray photoelectron spectroscopy (XPS), Auger Electron Spectroscopy (AES), Fourier Transform Infrared Spectroscopy (FTIR), and Raman spectroscopy are useful for thin film quantification and characterization. However, of these methods, only FTIR and Raman are sufficiently portable to be taken into the field to analyze thin film coatings on fixed surfaces. Further, and depending on the substances to be analyzed, some of these analytical methods do not have sufficient detection sensitivity for quantitative analysis of thin films. See, for example, *Encyclopedia of Materials Characterization*, Butterworth-Heinemann, Stoneham, M A Publishers, C. Brundle, et al., editors, ISBN-13: 978-0-7506-9168-0.

Various antimicrobial coatings applied to surfaces are in the form of thin films, so the coatings are often difficult or impossible to quantify and characterize out in the field where the coated surfaces are located, such as in hospitals and other institutions. Such films may have thicknesses in the several monolayers to micron range, with weights per unit area of less than about 1 mg/in$^2$. For some antimicrobial coatings (e.g., comprising a silane and/or a titanium species), the weight of the antimicrobial coating per unit of area may relate to residual antimicrobial efficacy of the coating. As such, knowing how much antimicrobial coating has been disposed on a surface, or that remains on the surface after a period of time and wear, is important in estimating the antimicrobial efficacy of the coating. Further, such coatings may be worn off by frequent handling of the surface or from various environmental exposures or cleaning protocols, and thus it is important to have a portable quantification method able to track the amount of antimicrobial coating remaining on a surface over time.

In spite of the vast knowledge in thin film analysis, there still exists a need for new portable analytical methods for quantifying antimicrobial coatings in the field, applicable on a diverse set of surfaces such as plastics and metals, non-destructive, rapid and inexpensive, in order to predict antimicrobial efficacy of a coated surface as the coating is worn off over time. In particular, a portable analytical method for quantifying antimicrobial coatings in a healthcare setting, such as a coating comprising a silane or titanium species, is needed.

SUMMARY

Contaminated surfaces are a critical risk factor for transmitting infectious disease. Current disinfection products provide short-term antimicrobial action; however, these surfaces can be re-contaminated within hours after cleaning. To address this limitation, long-lasting antimicrobial polymer coatings have been developed, as an adjunct to traditional disinfecting and cleaning protocols. Due to the microscale thickness and transparency of such polymer coatings, confirmation of the presence of a coating on a surface is difficult with conventional methods. To solve this problem, this disclosure provides a novel approach to measuring durable polymer coatings on glass, plastics, stainless steel and other surfaces to validate their presence and relative antimicrobial activity.

In various embodiments, a hand-held X-Ray Fluorescence Spectroscopy (XRF) analyzer is utilized to quantitatively evaluate the amount of antimicrobial polymer coating deposited on test surfaces and remaining after mechanical abrasion and washing. Additionally, the relationship between the XRF spectra and antimicrobial activity was evaluated using a modified version of an existing sanitization protocol for hard surfaces using *Staphylococcus epidermidis* as the test organism. The analytic method using XRF is simple, inexpensive, rapid, portable, quantifiable, and provides direct proof of the presence of an antimicrobial coating.

In various embodiments, a method of quantifying antimicrobial silane and/or titanium thin films using portable X-ray fluorescence spectroscopy (XRF) has now been discovered. In various embodiments, an XRF $_{14}$Si and/or $_{22}$Ti peak intensity becomes a predictor of antimicrobial efficacy and durability of antimicrobial thin films comprising a silane and/or a titanium species. In various embodiments, an antimicrobial coating comprises a silane having a quaternary ammonium chloride substituent, allowing for analysis of the coating and prediction of antimicrobial efficacy by assessing $_{14}$Si and/or $_{17}$Cl content in the coating by XRF.

The method comprises using a handheld XRF analyzer for quantifying an amount of silicon atoms ($_{14}$Si), titanium atoms ($_{22}$Ti), and/or chlorine ($_{17}$Cl) atoms present in an antimicrobial thin film coating, and relating the quantity of $_{14}$Si, $_{22}$Ti and/or $_{17}$Cl to an expected antimicrobial efficacy of the coating by using a calibration curve. In various embodiments, a calibration curve allows for interpolation of expected residual antimicrobial efficacy of an antimicrobial coating given a measured photon count of an element known to be present in the coating, such as silicon, titanium or chloride. In various embodiments, a calibration curve of antimicrobial efficacy versus elemental photon counts is specific to a particular organism, such as a bacteria or virus species.

In various embodiments, a method of estimating an expected level of residual antimicrobial efficacy for an antimicrobial coating comprising silicon and/or titanium comprises: obtaining $_{14}$Si or $_{22}$Ti photon counts from the antimicrobial coating using XRF spectroscopy; and converting the obtained $_{14}$Si or $_{22}$Ti photon counts to the expected level of residual antimicrobial efficacy using a calibration curve.

In various embodiments, a method of measuring a thickness of an antimicrobial coating comprising silicon and/or titanium comprises: obtaining $_{14}$Si or $_{22}$Ti photon counts from the antimicrobial coating using XRF spectroscopy; and converting the obtained $_{14}$Si or $_{22}$Ti photon counts to the thickness using a calibration curve.

In various embodiments, a method of measuring the weight per unit of surface area of an antimicrobial coating comprising silicon and/or titanium comprises: obtaining $_{14}$Si or $_{22}$Ti photon counts from the antimicrobial coating using XRF spectroscopy; and converting the obtained $_{14}$Si or $_{22}$Ti photon counts to the weight per unit of surface area using a calibration curve.

In various embodiments, the antimicrobial coating comprises a silane selected from the group consisting of 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropylsilanetriol, 3-aminopropyltrimethoxysilane, 3-aminopropyltriethoxysilane, 3-aminopropylsilanetriol, homopolymers therefrom, and mixtures thereof. In certain aspects, XRF analysis of antimicrobial coatings comprising 3-(trimethoxysilyl) propyl dimethyl octadecyl ammonium chloride or 3-(trihydroxysilyl) propyl dimethyl octadecyl ammonium chloride may comprise obtaining $_{17}$Cl photon counts, or photon counts from another halide associated with the ammonium substituent if not chloride. In various embodiments, the antimicrobial coating comprises nanoparticulate $TiO_2$.

In various embodiments, the step of obtaining the $_{14}$Si or $_{22}$Ti photon counts comprises irradiation of the antimicrobial coating with X-rays emanating from a handheld XRF analyzer and detecting X-ray emissions from the coating.

In various embodiments, the calibration curve comprises an x/y plot of the expected level of residual antimicrobial efficacy for a desired microorganism versus the $_{14}$Si or $_{22}$Ti photon counts.

BRIEF DESCRIPTION OF THE DRAWING FIGURES

The subject matter is pointed out with particularity and claimed distinctly in the concluding portion of the specification. A more complete understanding, however, may best be obtained by referring to the detailed description and claims when considered in connection with the following drawing figures:

Figure 6:
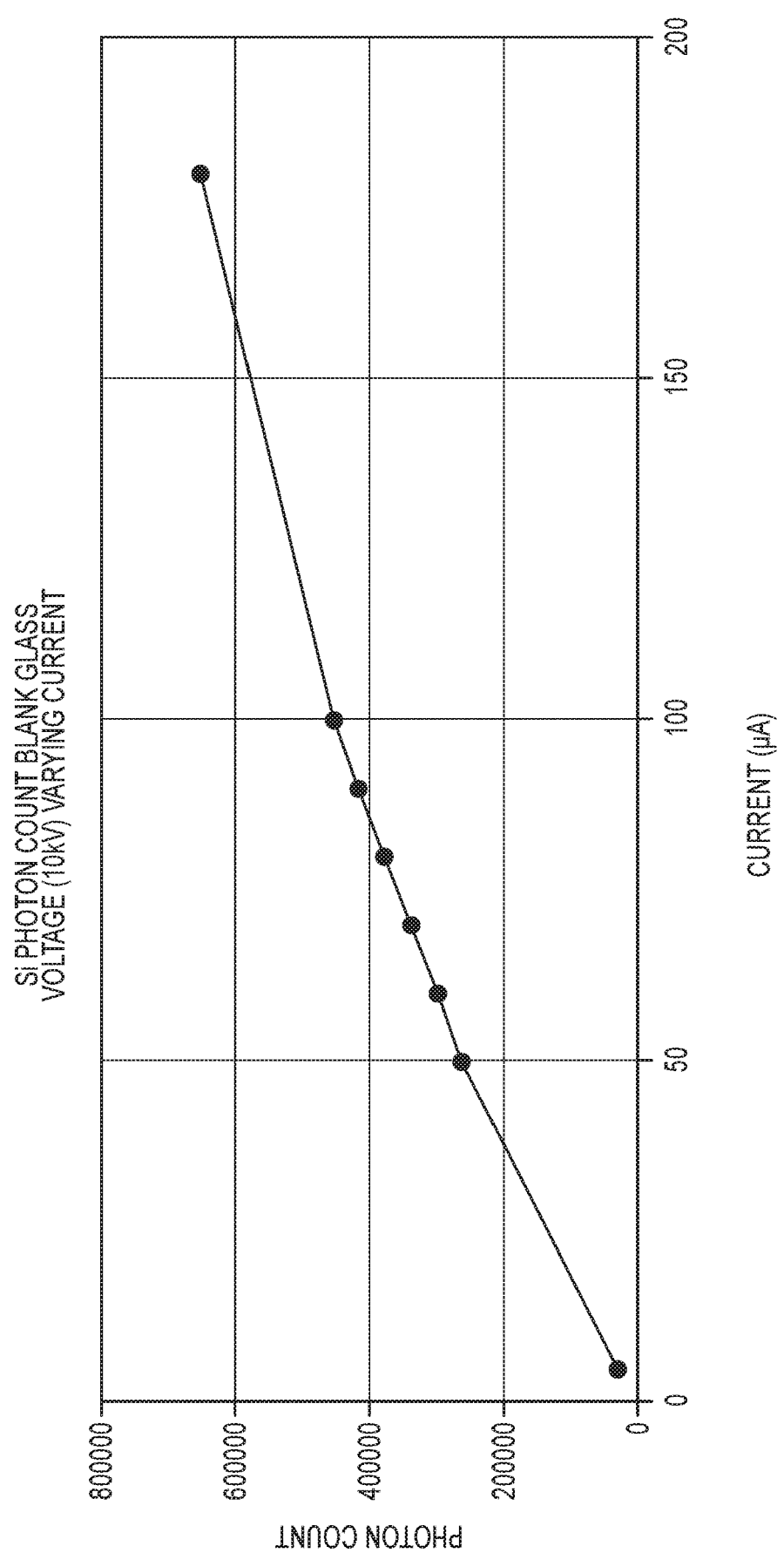
Figure 7:
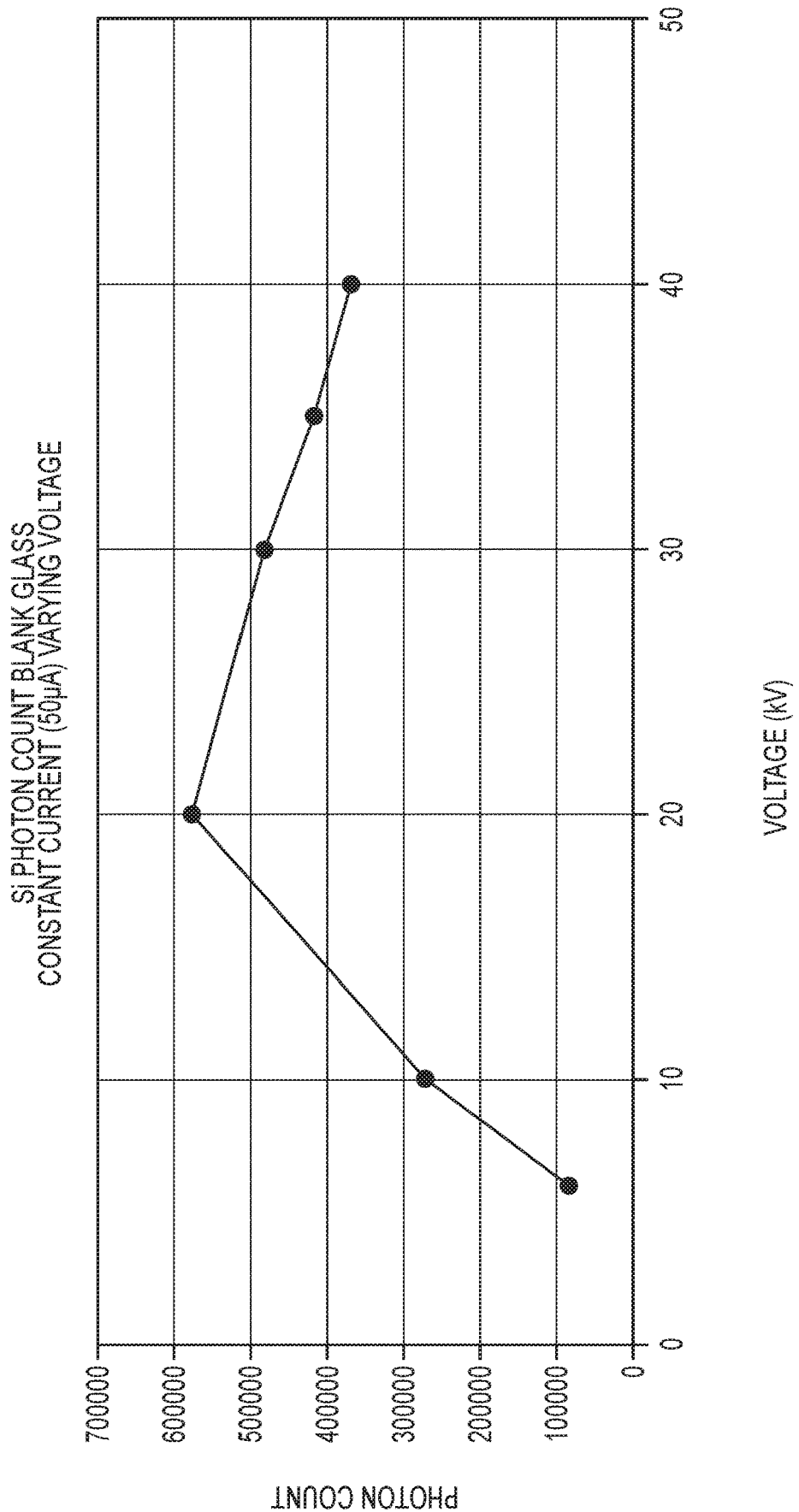
Figure 8:
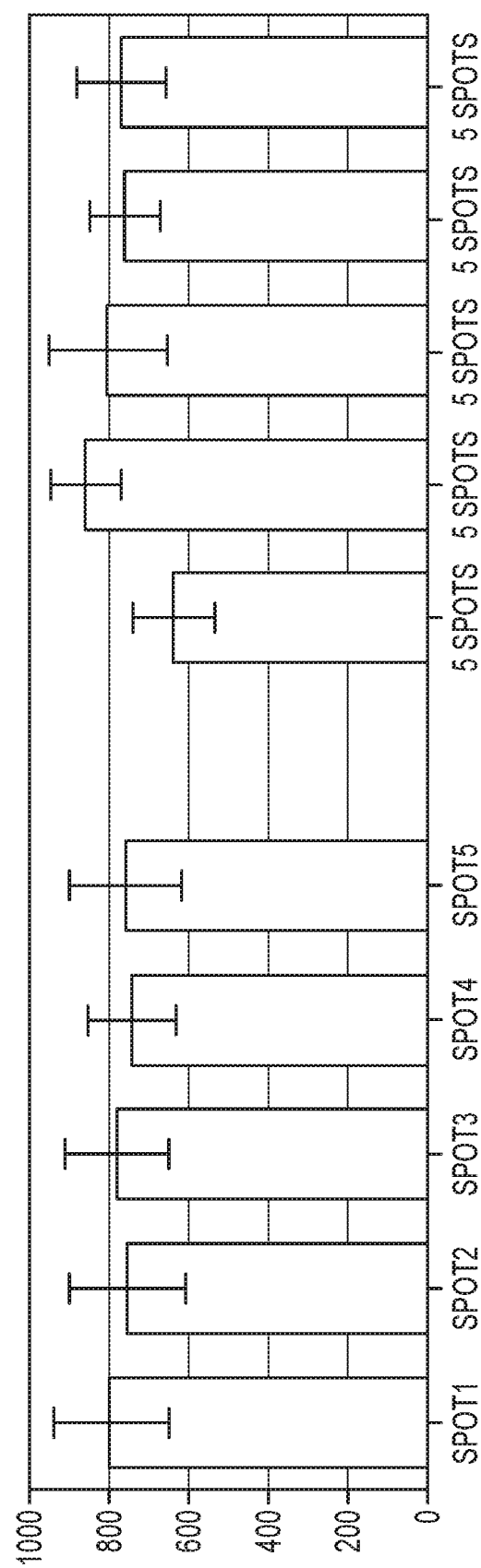
Figure 9:
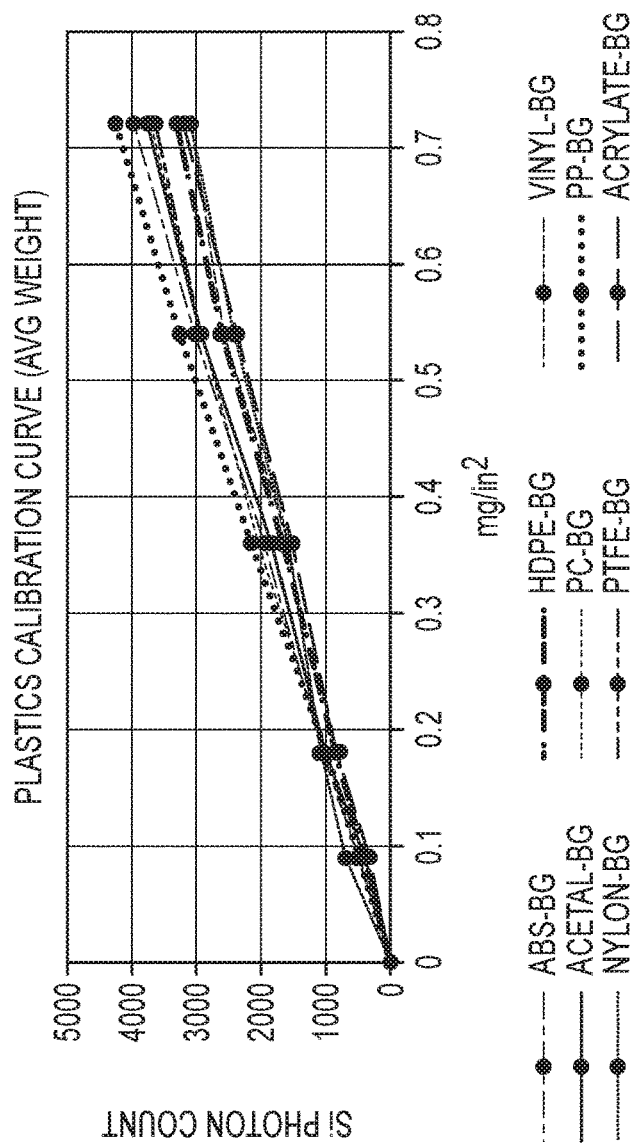
Figure 10:
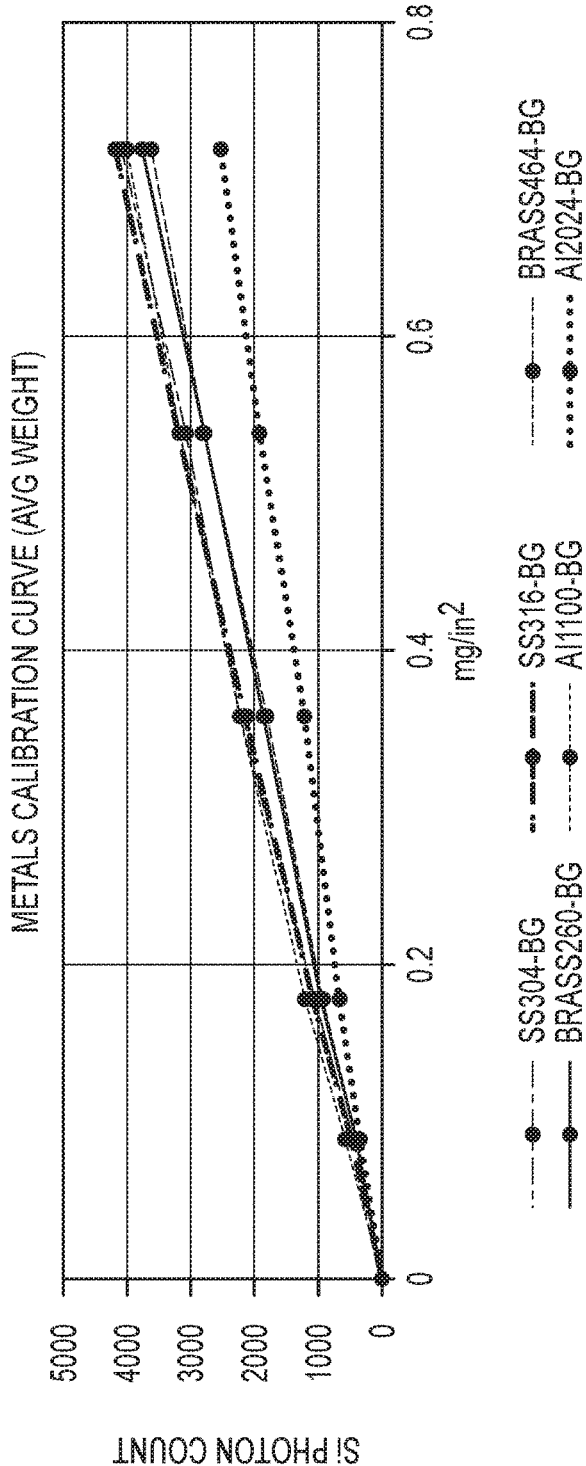
Figure 11:
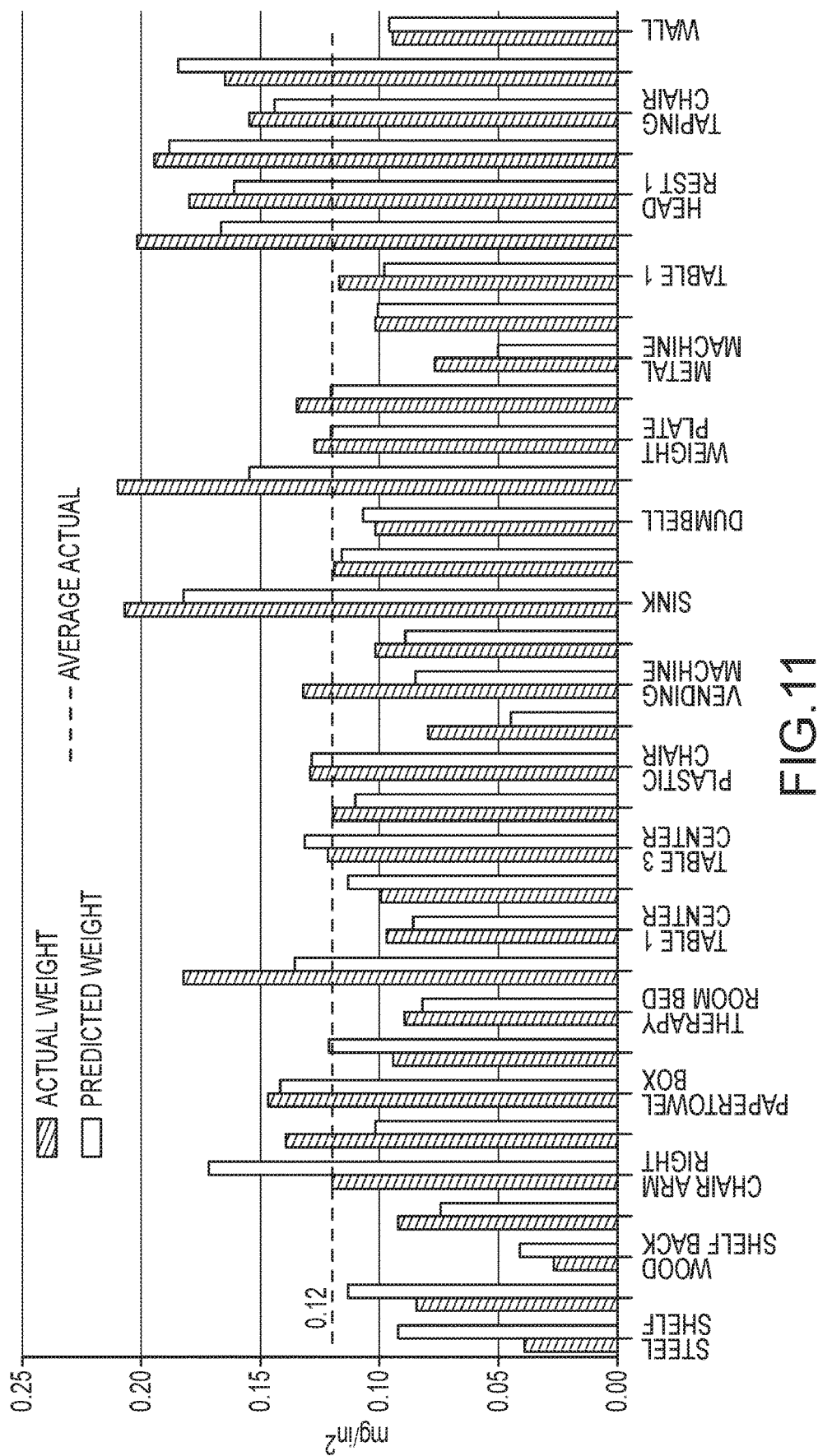
Figure 12:
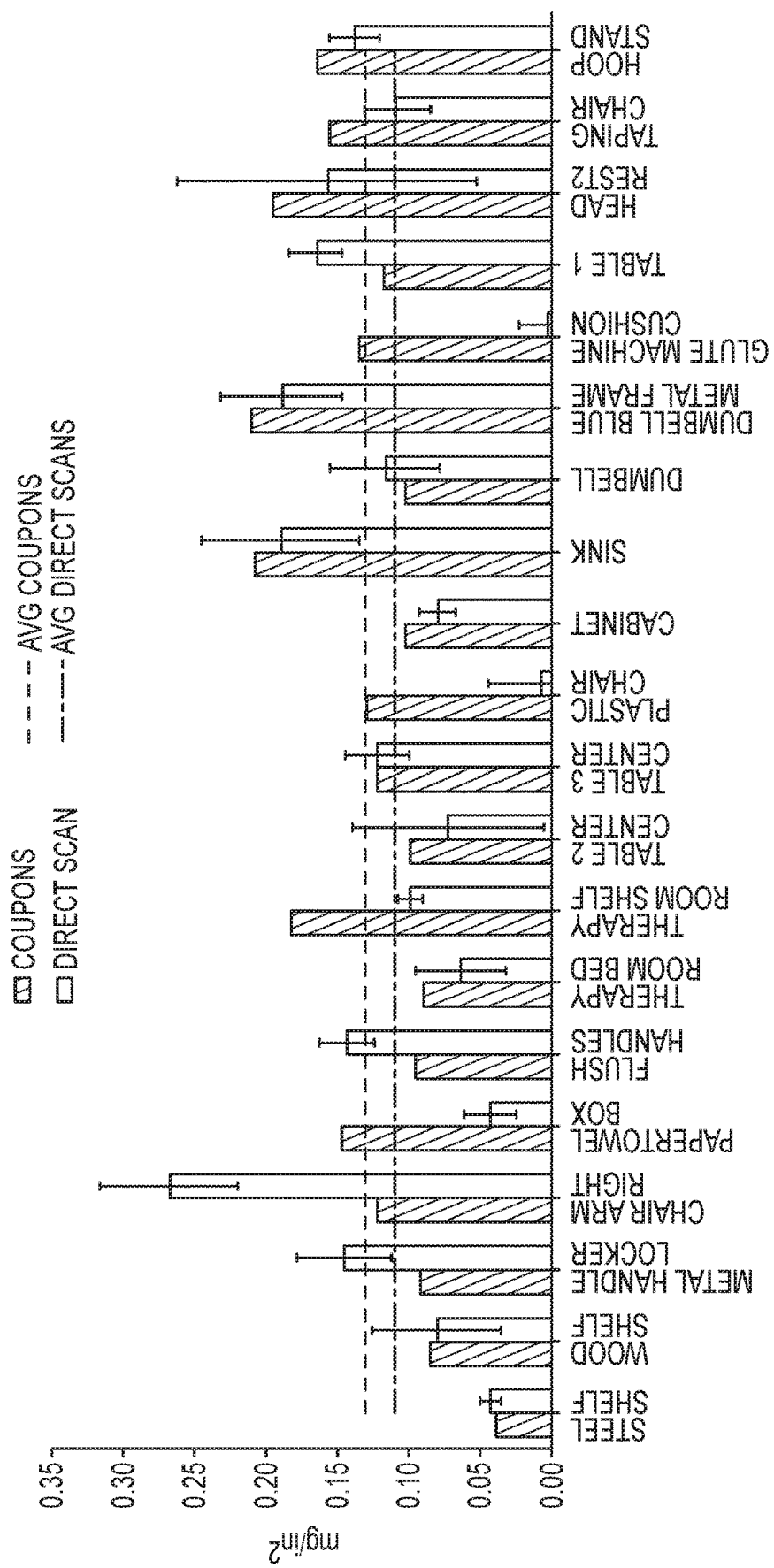
Figure 13:
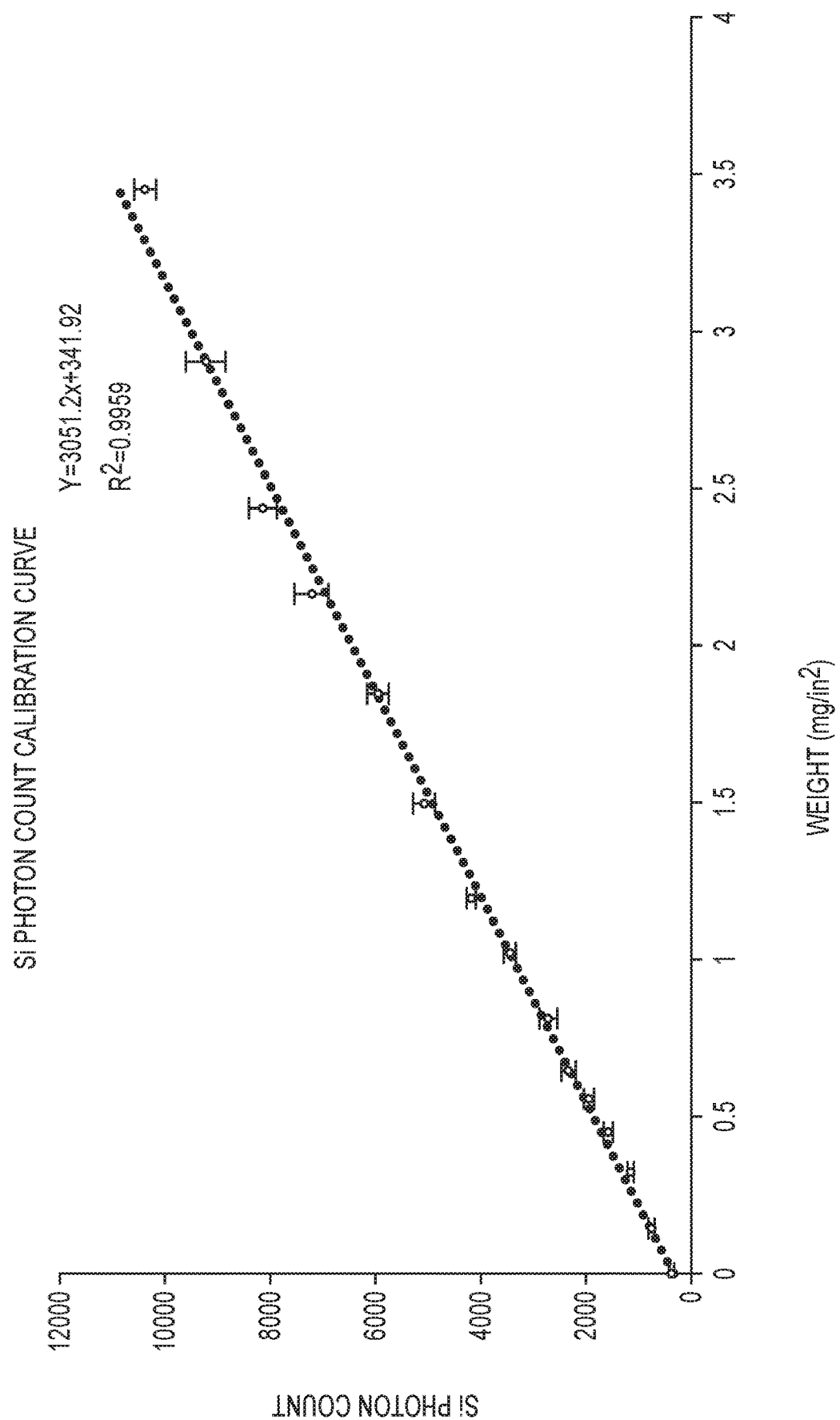
Figure 14:
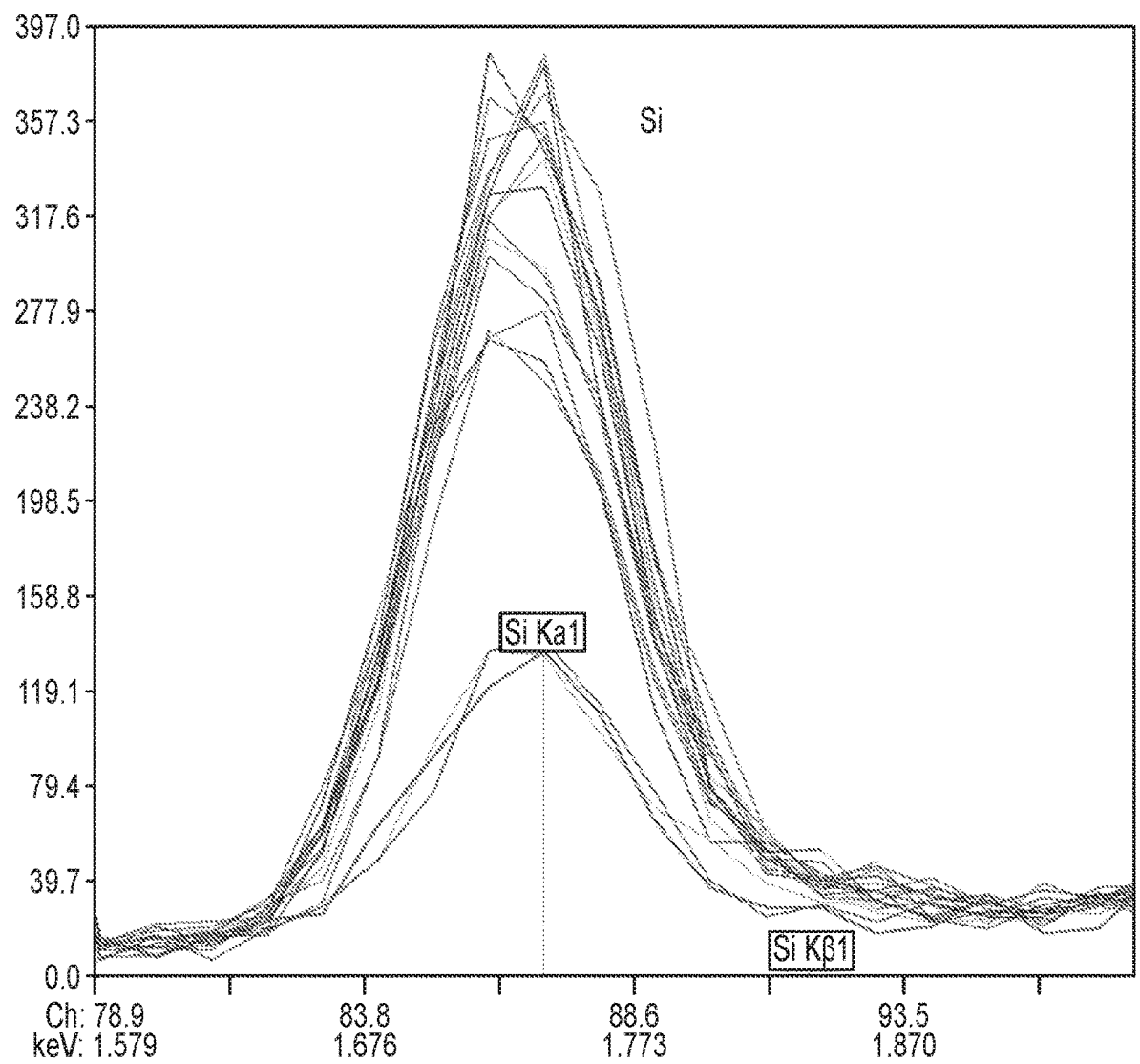
Figure 15:
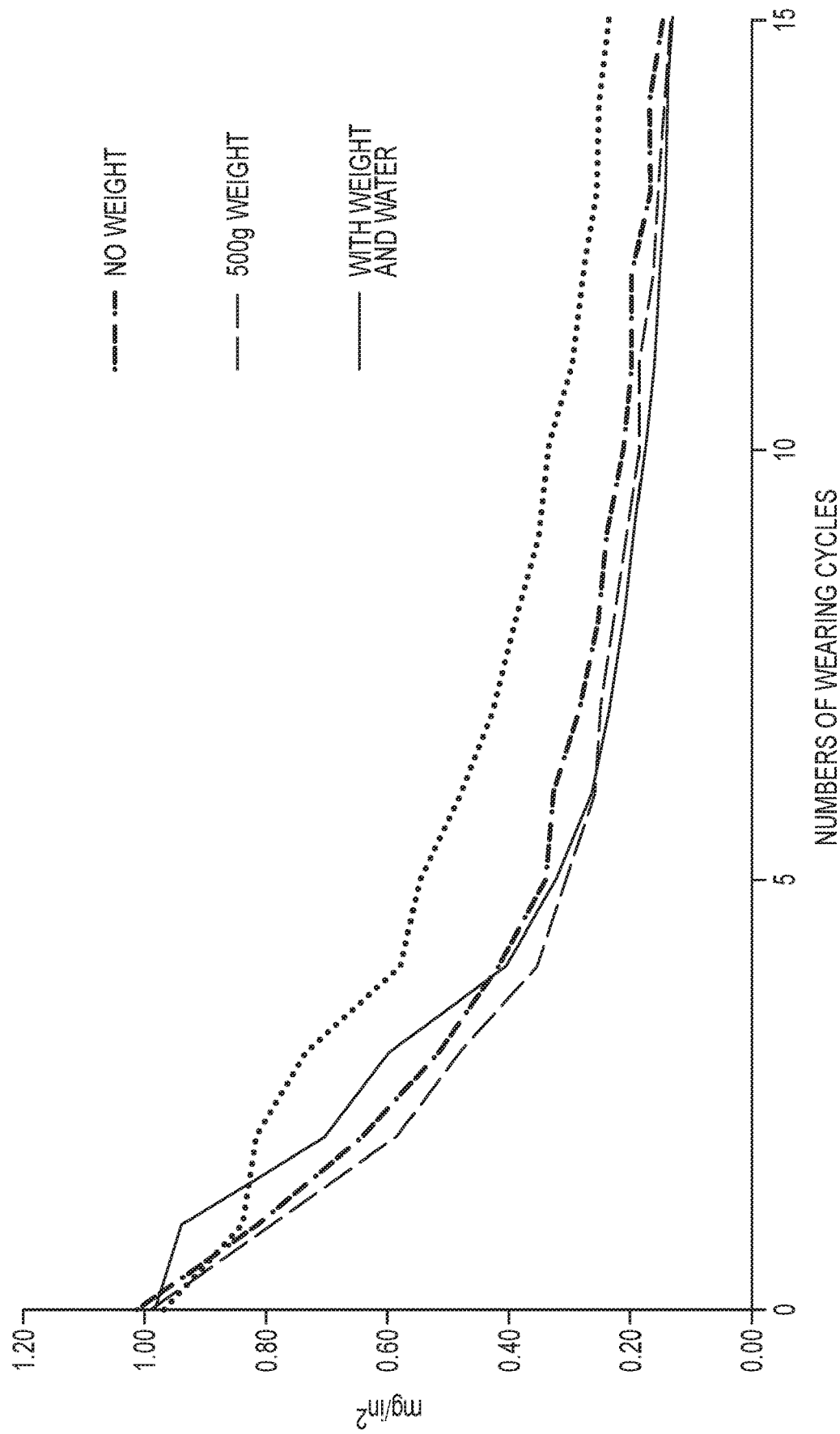
Figure 16:
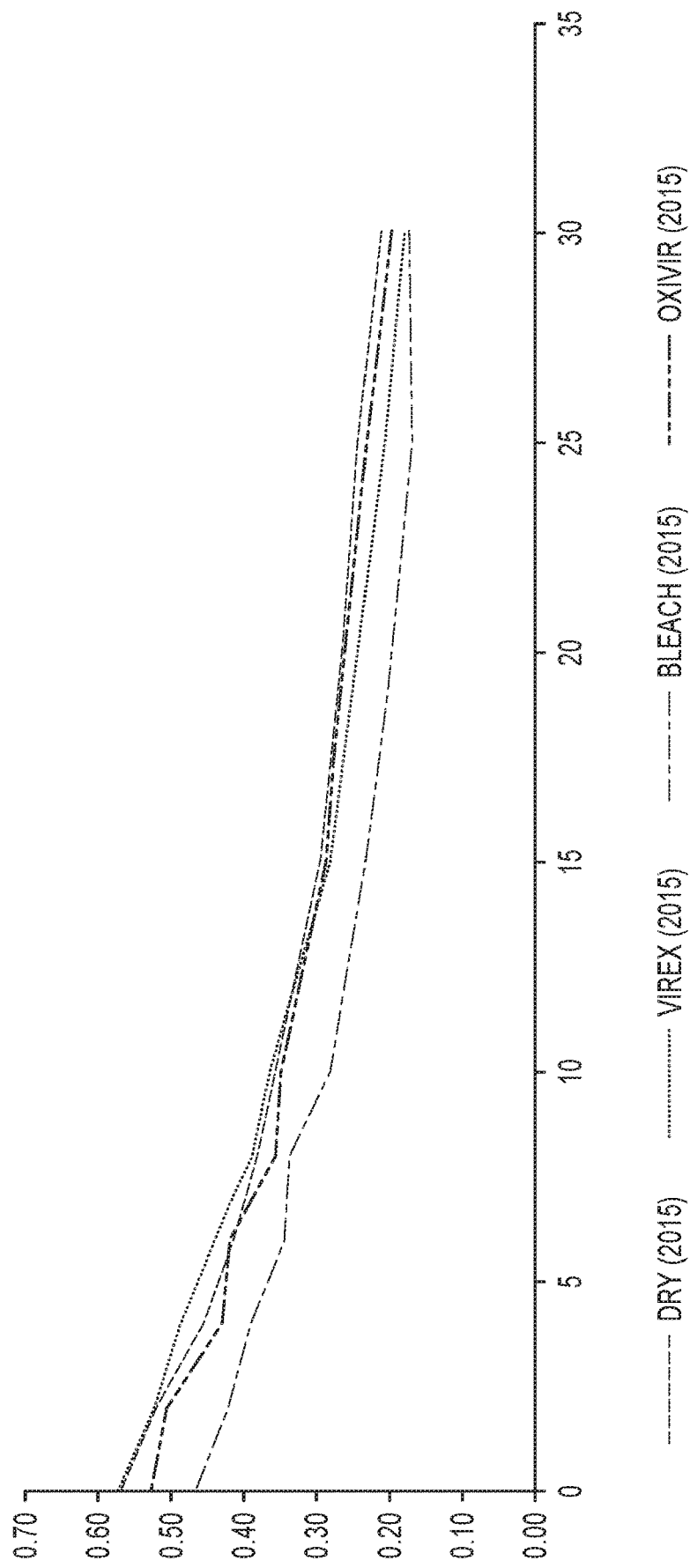
Figure 17:
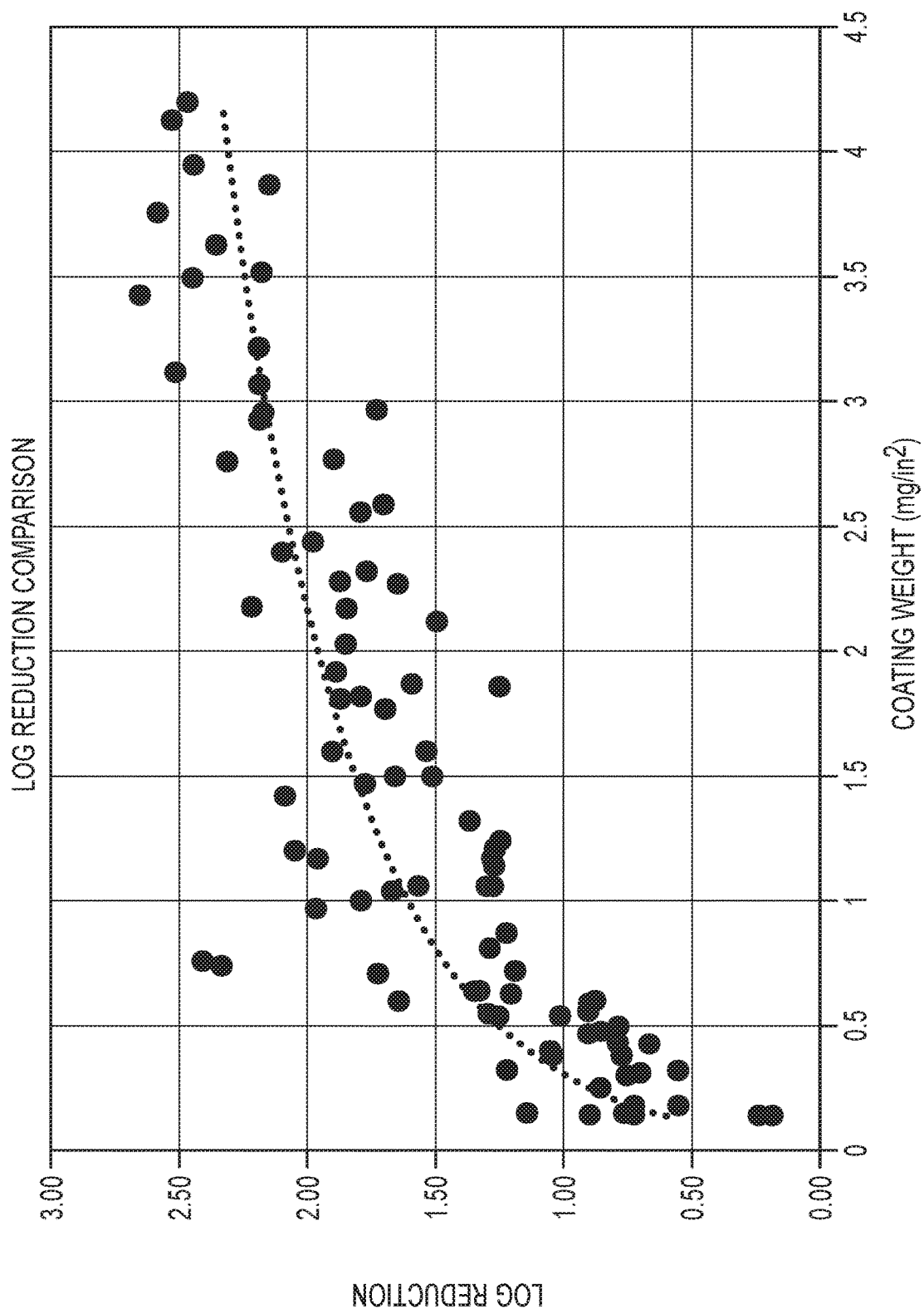

FIG. 6 shows a plot of silicon photon count at constant current (50 µA) versus voltage varied from about 6 kV to about 40 kV indicating linearity particularly in the midrange and the suitability of choosing 50 µA current;

FIG. 7 shows a plot of silicon photon count at constant voltage (10 kV) versus current varied from about 5 µA to about 180 µA, indicating no significant advantage in data precision by voltage variation and thus the suitability of 10 mV;

FIG. 8 shows two combined bar charts, with the right bar chart showing scans of 8 mm areas indicated as spots 1-5 (i.e., multiple scanning) spaced apart by about 50-100 cm, and the left bar chart showing several measurements of each spot to improve precision (i.e., averaging);

FIG. 9 shows a plot of silicon photon counts versus average weight for various plastics, in order to arrive at a universal calibration curve;

FIG. 10 shows a plot of silicon photon counts versus average weight for various metals, in order to arrive at a universal calibration curve;

FIG. 11 shows results when stainless steel coupons were weighed and placed at different locations in a professional sports facility before electrostatic application of the antimicrobial coating product. Post-treatment XRF analysis results were compared to the net increase weight of the stainless-steel coupons;

FIG. 12 shows direct XRF analysis of compatible surfaces (low background noise and homogenous composition) in the field, performed in locations adjacent to pre-weighed stainless steel reference coupons;

FIG. 13 shows comparison of the amount of antimicrobial polymer coating (in mg/in$^2$) and the XRF silicon photon count resulting in a calibration curve having a high degree of linearity ($R^2$=0.9959);

FIG. 14 shows $_{14}$Si XRF spectra for a progressively abraded antimicrobial thin film comprising a silane on a stainless-steel coupon. The overlaid XRF spectra demonstrate the usefulness of the XRF method in monitoring the amount of antimicrobial thin film remaining on a surface as the thin film is mechanically abraded;

FIG. 15 sets forth a wearing profile of an antimicrobial coating, wherein treated stainless steel coupons were subjected to different abrasion conditions on a Gardco™ straight line washability machine used to represent routine cleanings or frequent handling of the coated surface. The plot shows that XRF can be used to detect the wearing of the coating caused by routine cleanings;

FIG. 16 shows plots of coating coverage versus number of wear cycles for coatings subjected to mechanical wear or three different cleaners (VIREX, bleach or OXIVER). The amount of coating remaining was determined by XRF analysis and using the calibration curve; and FIG. 17 shows a plot of antimicrobial efficacy (log 10 reduction) versus coating weight/in$^2$, wherein the coating weights were determined by XRF analysis.

DETAILED DESCRIPTION

The detailed description of exemplary embodiments refers to the accompanying drawings, which show exemplary embodiments by way of illustration and their best mode. While these exemplary embodiments are described in sufficient detail to enable those skilled in the art to practice the invention, it should be understood that other embodiments may be realized, and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, a method of surface analysis using X-ray fluorescence (XRF) spectroscopy is disclosed. In various aspects, an XRF surface analysis technique is used to analyze an antimicrobial coating previously applied to a surface of an object. In various aspects, XRF surface analysis provides both weight and thickness of an antimicrobial coating. In various examples, XRF surface analysis provides a way to verify the antimicrobial efficacy such a coating will provide after repeated handling, mechanical and chemical abrasion, or from washing of the coating. In various embodiments, the surface material may comprise Formica®, stainless steel or other metals and alloys, glass, or various plastics. The objects may comprise fomites in a healthcare setting, such as countertops, sinks, faucets, door handles, bed rails, arms of chairs, tables, food trays, and the like.

In various embodiments, a method of measuring a thickness of an antimicrobial coating comprising a silane and/or a titanium species comprises obtaining a $_{14}Si$ and/or $_{22}Ti$ peak intensity from the coating using XRF spectroscopy, and converting the obtained $_{14}Si$ and/or $_{22}Ti$ peak intensity to the thickness of the antimicrobial thin film using a calibration curve.

In various embodiments, a method of measuring a weight per unit of surface area of an antimicrobial coating comprising a silane and/or a titanium species comprises obtaining a $_{14}Si$ and/or $_{22}Ti$ peak intensity from the coating using XRF spectroscopy and converting the obtained $_{14}Si$ and/or $_{22}Ti$ peak intensity to the weight per unit of surface area of the antimicrobial coating using a calibration curve.

In various embodiments, a method of predicting a level of residual antimicrobial efficacy for a silane and/or titanium species antimicrobial coating comprises obtaining a $_{14}Si$ and/or $_{22}Ti$ peak intensity from the silane and/or titanium coating using XRF spectroscopy and converting the obtained $_{14}Si$ and/or $_{22}Ti$ peak intensity to the predicted level of residual antimicrobial efficacy using a calibration curve.

Definitions and Interpretations

As used herein, the term "XRF" refers to X-ray fluorescence spectrometry and specifically to an X-ray fluorescence surface analysis method wherein a sample is irradiated with X-rays having a certain energy from a controlled X-ray tube to excite particular atoms present in the sample. When the atoms are struck by the X-rays they release fluorescent X-rays having energy equal to the difference in energy between quantum states of the electrons of the atoms. The energy of the emitted photons identifies the element, and the peak height and/or intensity of the fluorescence correlates to the concentration of the element in the sample. What results from XRF analysis is a spectrum of peak intensities (units of CPS, i.e., counts/second, or magnitudes $10^2$ CPS, $10^3$ CPS, etc., as needed) versus wavelength (e.g., in nm). The wavelength range is typically from about 0.01 nm to about 10 nm, corresponding to energies of 125 keV to 0.125 keV, so that elemental information is obtained for elements in the range from magnesium to uranium. For the methods disclosed herein, photon counts of $_{14}Si$ or $_{22}Ti$ atoms is then correlated to the quantity of silicon or titanium in a coating analyzed.

XRF is a relative measurement, meaning that calibration standards in the wavelength (element) range of interest are required to transpose the peak intensities, such as for $_{14}Si$ and/or $_{22}Ti$ intensities, into absolute elemental compositions and thicknesses. The quantification is performed using empirical calibration functions. Quantification with fundamental parameters allows XRF to be used as an absolute technique. For an explanation of these concepts, see P. van De Weijer, et al., "Elemental Analysis of Thin Layers by X-Rays," *Philips J. Res.*, 47, 247-262, 1993.

As used herein, the term "XRF analyzer" refers to an instrument capable of performing XRF spectroscopy. An analyzer will typically comprise an X-ray source, a pre-amp detector, a digital signal processor and a CPU. Of interest herein are handheld XRF analyzers that combine all the necessary components into a single housing shaped like a power tool and having a LED screen to read information. Handheld XRF analyzers find use in screening products coming off production lines, sorting scrap metals and researching antiquities in the field. A handheld XRF surface analyzer is utilized herein to analyze antimicrobial coatings that may have been applied to various surfaces in a healthcare facility, and elsewhere where portability of the analyzer is important.

As used herein, the term "antimicrobial" is used generally to indicate at least some level of microbe kill by a liquid composition or a dried coating present on a portion of a surface. For example, antimicrobial may be used to indicate a biostatic efficacy, sanitizing level (3-log, or 99.9%) reduction in at least one organism, or a disinfection level (5-log, or 99.999%) reduction in at least one organism, or sterilization (no detectable organisms). Microbes, or microorganisms, may include any species of bacteria, virus, mold, yeast, or spore. Of interest herein are bacterial organisms found in healthcare settings and other institutions, such as, but not limited to, *E. coli, S. aureus*, MRSA, *S. epidermidis, S. saprophyticus, S. agalactiae, S. pneumoniae, S. pyogenes, S. typhi, S. typhimurium, P. aeruginosa, M. pneumoniae, M. jeprae, M. tuberculosis*, and *M. ulcerans*, and various viral species such as HIV, hepatitis A, B, C, D, E, influenza, SARS coronavirus, and H1N1.

The terms "residual antimicrobial," "residual self-sanitizing," and "self-decontaminating surface" are used interchangeably to indicate a physical property of a coating on a surface of a hard, inanimate object, namely that the coating is capable of maintaining antimicrobial efficacy over a certain period of time under certain conditions once the surface is coated with an antimicrobial coating composition and the composition dried on the surface. A coating on a surface may maintain residual antimicrobial efficacy indefinitely, or the coating may eventually "wear out," such as when mechanically abraded or washed from the surface, losing its residual antimicrobial efficacy. An antimicrobial coating composition (e.g., a liquid solution) may function as a contact sanitizer, disinfectant, or sterilant when first applied to a surface, killing the organisms already present on the surface, and also have the ability to leave behind a residual antimicrobial coating on the surface once the composition is dried or cured thereon, to keep inactivating new microorganisms that contact the dried coating. In various embodiments, coating compositions may not be antimicrobial until dried or cured on a surface but are still referred to as antimicrobial coating compositions herein because of their ability to produce a residual antimicrobial effect on the surface, and for the sake of brevity. The residual antimicrobial effect exhibited by the antimicrobial coatings is not limited by a particular mechanism of action, and no such theories are proffered. For example, an antimicrobial effect measured for a coating on a surface may be the result of intracellular mutations, inhibition of certain cellular processes, rupture of a cell wall, immobilization and thus prevention of transfer or detection when swabbing, or a nondescript inactivation of the organism. Other antimicrobial effects may include inhibiting the reproduction of an organism or inhibiting the organism's ability to accumulate into biofilms. In other embodiments, an antimicrobial effect may be a stasis such that organisms cannot proliferate to the point of reaching a pathogenic level on the coated surface.

As used herein, the term "antimicrobial coating composition" or "residual self-sanitizing coating composition" refers to a chemical composition, primarily liquid, comprising at least one chemical species, which is used to produce a residual self-sanitizing antimicrobial coating on a surface after the composition is applied to a surface of an object and then allowed to dry. However, the term is extended to include a composition that may be applied sequentially (e.g., over or under) or contemporaneously with the application of an antimicrobial coating composition comprising a recognizable antimicrobial active. In various embodiments, this precoating or overcoating may act as an adherent or a sealant to assist in bonding the residual antimicrobial coating to the surface, improve durability of the overall coating, and/or to provide a catalytic effect or some sort of potentiation or synergy with the residual antimicrobial coating comprising an antimicrobial active. For simplicity, each one of multiple compositions used sequentially or contemporaneously to produce an overall residual antimicrobial coating on a surface is referred to as an "antimicrobial coating composition," even if one or more of the compositions used for coating has no identifiable antimicrobial active or where the active agent is uncertain. For example, a coating composition comprising a silane may be first applied to a surface of an object and dried, followed by a coating composition comprising a titanium species, which is applied to the surface and dried.

An antimicrobial coating composition herein may comprise a neat, 100% active chemical species or may be a solution or suspension of a single chemical species in a solvent such as water or an alcohol (methanol, ethanol, iso-propanol, etc.). In other embodiments, a composition may comprise a complex mixture of chemical substances, some of which may chemically react (hydrolyze, self-condense, etc.) within the composition to produce identifiable or unidentifiable reaction products. For example, a monomeric chemical species in an antimicrobial coating composition may partially or fully polymerize while in solution prior to a coating process using that composition. In various embodiments, chemical constituents within an antimicrobial coating composition may chemically react on the surface that the composition is applied to, such as while the composition is drying and concentrating on the surface. Antimicrobial coating compositions for use in various embodiments may further comprise any number and combination of inert excipients, such as for example, solvents, surfactants, emulsifiers, stabilizers, thickeners, free-radical initiators, catalysts, etc. Exemplary antimicrobial coating compositions that leave behind a residual self-sanitizing coating on a surface, and that may benefit from XRF surface analysis per the methods disclosed herein, include, but are not limited to, solutions comprising and organosilane selected from the group consisting of 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropylsilanetriol, 3-aminopropyltrimethoxysilane, 3-aminopropyltriethoxysilane, 3-aminopropylsilanetriol, and mixtures thereof. Any combination of these silanes, optionally including an organic amine such as triethanolamine, may be used in an aqueous or alcoholic solution amenable to spray or dip coating of surfaces. In various embodiments, an antimicrobial coating composition is sprayed onto a surface, and in some instances, electrostatically sprayed.

In various embodiments, antimicrobial coatings that may benefit from analysis using the XRF surface analysis methods herein, are disclosed in the following patent references, each assigned to Allied Bioscience, Inc, and each of which is incorporated herein by reference in its entirety for all purposes: U.S. Pat. Nos. 10,463,046; 10,456,493; 10,421,870; 10,420,342; 10,258,046; 10,238,114; 10,194,664; 10,182,570; 10,040,952; 10,040,097; 9,963,596; 9,918,475; 9,856,360; 9,855,584; 9,757,769; and 9,528,009; and U.S. patent application Ser. No. 16/591,785 filed Oct. 3, 2019.

As used herein, the shorthand notation "2015" indicates an antimicrobial coating composition or a dried coating obtained therefrom comprising 3-(trimethoxysilyl) propyl dimethyl octadecyl ammonium chloride and/or 3-(trihydroxysilyl) propyl dimethyl octadecyl ammonium chloride. The shorthand "2020" indicates an antimicrobial coating composition or a dried coating obtained therefrom comprising 3-chloropropyltrimethoxysilane, 3-chloropropyltriethoxysilane, and/or 3-chloropropylsilanetriol. The shorthand "2030" indicates an antimicrobial coating composition or a dried coating obtained therefrom comprising 3-aminopropyltrimethoxysilane, 3-aminopropyltriethoxysilane, and/or 3-aminopropylsilanetriol. A "T" placed after any of these designations, e.g., "2015-T," indicates a coating obtained by both the 2015 silane antimicrobial composition and a titanium species composition. Such a combined coating may be obtained by simultaneous application, or stepwise application, in either order, or a 2015 composition and a titanium species composition.

In various embodiments, an antimicrobial thin film for analysis herein comprises a titanium coating, either alone or in conjunction with a silane antimicrobial thin film. In some instances, the titanium coating may act as a sealant or adherent for a silane antimicrobial thin film, such as applied underneath or overtop the silane coating on a surface. In various aspects, a titanium coating herein can be quantified by XRF spectrometry, specifically by the $_{22}$Ti peak intensities in an XRF spectrum. In various aspects, a titanium coating may be more simply referred to herein as an antimicrobial thin film because it may be used in concert with a silane antimicrobial thin film. A titanium antimicrobial thin film may comprise a titanium(IV) species, as described below.

As used herein, the term "titanium (IV) species" refers to any chemical compound comprising at least one tetravalent titanium atom, regardless if monomeric, dimeric, trimeric, or polymeric. Non-limiting examples include titanium (IV) oxide ($TiO_2$) in any form, other Ti(IV) species, (e.g., $TiCl_4$, Ti—$(O-i-C_3H_7)_4$ or any other Ti(IV) alkoxide, phenoxide or halide). Various forms of $TiO_2$ for use herein include, but are not limited to, rutile, anatase, brookite, hollandite-like, ramsdellite-like, $\alpha$-$PbO_2$-like, baddeleyite-like form, orthorhombic $TiO_2$—OI, cubic, and/or cotunnite-like forms. The most common crystalline forms are anatase, brookite and rutile. In various examples, Ti(IV) species for use herein comprise Ti nanoparticles. Further, Ti(IV) species for use herein include "titanyl-oxide moieties," which is a broad term defined herein to include any and all Ti compounds and mixtures known to form $TiO_2$ thin films, or at least suspected as able to form $TiO_2$ thin films, such as via the sol-gel process. A titanyl sol-gel is a precursor in the preparation of $TiO_2$ thin films. For example, a mixture of $Ti(OC_4H_9)_4$, ethanol, water, and diethanolamine, in a 1:26.5:1:1 molar ratio, has been disclosed as forming a $TiO_2$ film (see J. Yu, et al., *Materials Chemistry and Physics*, vol. 69, pp 25-29 (2001)). This reference further discloses that whether or not the film is photocatalytic depends, inter alia, on the curing conditions for the sol-gel after surface application, e.g., using high temperatures. In another non-limiting example, a sol-gel route to mesoporous and nanocrystalline anatase thin layers begins with acidic hydrolysis of titanium isopropoxide, (see F. Bosc, *Chem. Mater.*, 15(12), pp 2463-2468, (2003)).

In certain examples, titanyl-oxide moieties for use herein comprise a colloidal suspension of from about 0.5 wt. % to about 50 wt. % $TiO_2$ in water. In other examples, titanyl-oxide moieties comprise an aqueous mixture of Ti—$(O-i-C_3H_7)_4$ usable to create a thin film of $TiO_2$ via the sol-gel process. Such compositions may also comprise an organic solvent, such as an alcohol like n-propanol or n-butanol, a surfactant, or an acid catalyst. In the sol-gel process, $TiO_2$ is prepared by hydrolysis, condensation and polycondensation of a titanium alkoxide, such as Ti—$(O-i-C_3H_7)_4$ or $TiCl_4$. A $TiO_2$ sol-gel composition, when coated onto a portion of a surface, provides a thin film $TiO_2$ coating on the portion of the surface.

In various embodiments, titanyl-oxide moieties comprise $Ti(OR^3)_4$, wherein $R^3$ is alkyl, substituted alkyl, aryl, or substituted aryl, and wherein the four separate $R^3$ groups are identical or different. Examples of $Ti(OR^3)_4$ include, but are not limited to, titanium tetramethoxide, titanium tetraethoxide, titanium methoxide triethoxide, titanium tetra-n-propoxide, titanium tetra-i-propoxide, and titanium tetraphenoxide. Depending on the physical properties of the titanium (IV) species, the compound may be used neat (e.g., Ti—$(O-i-C_3H_7)_4$) or dissolved in an alcohol or other organic solvent(s), such as the corresponding alcohol, where feasible, (methanol, ethanol, i-propanol, etc.). Thus, titanyl-oxide moieties may in some instances comprise a solution of Ti—$(O-i-C_3H_7)_4$ in isopropanol or some other alcohol.

In various embodiments, titanyl-oxide moieties comprise $Ti(OR^3)_4$, wherein $R^3$ is alkyl, substituted alkyl, aryl, or substituted aryl. In certain aspects, titanyl-oxide moieties may further comprise a solvent selected from the group consisting of water, alkanols, diols, triols, chlorinated organic solvents, ethers, amines, esters, ketones, aldehydes, lactones, phenolics, and mixtures thereof. In certain examples, a solvent is selected from, but not limited to, water, methanol, ethanol, n-propanol, i-propanol, ethylene glycol, 1,2-propanediol, 1,3-propanediol, glycerin, methylene chloride, trichloromethane, carbon tetrachloride, ethylene glycol monoalkyl ether, ethylene glycol dialkylether, propylene glycol monoalkyl ether, propylene glycol dialkyl ether, ethylene glycol monophenyl ether, ethylene glycol diphenyl ether, propylene glycol monophenyl ether, propylene glycol diphenyl ether, diethylether, tetrahydrofuran, pyridine, triethanolamine, diethanolamine, triethylamine, ethylacetate, acetone, furfural, and N-methyl-2-pyrrolidone, and combinations thereof. In various examples, titanyl-oxide moieties consist essentially of Ti—$(O-i-C_3H_7)_4$. Other examples include Ti—$(O-i-C_3H_7)_4$ and an alcohol, and a composition comprising Ti—$(O-i-C_3H_7)_4$ and iso-propanol.

In various examples, titanyl-oxide moieties for use herein comprise an aqueous solution of peroxotitanium acid and peroxo-modified anatase sol, which is disclosed in the literature as a room temperature route to $TiO_2$ thin films, (see Ichinose, H., et al., *Journal of Sol-Gel Science and Technology*, September 2001, Volume 22, Issue 1-2, pp 33-40, and Ichinose, H., et al., *J. Ceramic Soc. Japan*, Volume 104, Issue 8, pp 715-718 (1996)).

In various examples, the titanyl-oxide moieties for use herein is a sol-gel that comprises about 0.5 wt. % peroxotitanium acid and about 0.5 wt. % peroxo-modified anatase sol, remainder water. A non-limiting example of a titanyl-oxide moieties composition for use herein comprises 0.85 wt. % of a mixture of peroxotitanium acid and peroxo-modified anatase sol (titanium oxide (IV)), remainder water. In various examples, a titanyl-oxides moieties composition comprises 0.8-0.9 wt. % of a mixture of titanium oxide (IV) and peroxotitanium acid, with the remainder, i.e., 99.1-99.2 wt. %, water. In various embodiments, this sol-gel mixture may be referred to as "0.85 wt. % aqueous peroxotitanium acid and peroxo-modified anatase sol."

This titanyl sol-gel, or other sol-gels prepared by other processes as discussed, may be coated onto a surface by itself, or in combination with an antimicrobial silane coating. In an example where the surface comprised a borosilicate glass slide, AFM imaging (50 μm² scan area) revealed a 0.85 wt. % aqueous peroxotitanium acid and peroxo-modified anatase sol coating, when dry, to have an average roughness of 25.76 nm. In an example where the surface comprised mica, AFM imaging (1 μm² scan area) revealed a 0.85 wt. % aqueous peroxotitanium acid and peroxo-modified anatase sol coating, when dry, provides an average particle size of 30 nm. Although not wishing to be bound by any particular theory, these particles may comprise, at least in part, nanoparticulate $TiO_2$.

As used herein, the term "organosilane," or more simply, "silane," refers to silicon-containing organic chemicals, as opposed to inorganic forms of silicon, such as $SiO_2$ or water glass species ($Na_2SiO_3$, and the like). An organosilane is typically a molecule including carbon and silicon atoms but may also include any other heteroatoms such as oxygen, nitrogen, or sulfur. Organosilane compounds for use in various embodiments herein may be chemically reactive or inert, and may be monomeric, dimeric, trimeric, tetrameric, or polymeric. Organosilane monomers for use in various embodiments may be chemically reactive in that they at least partially hydrolyze or self-polymerize or form various adducts and/or polymers with other chemical species in a composition or on a surface. Exemplary organosilanes for measurement herein include, but are not limited to, organosilanes having three reactive groups bonded to silicon and one non-hydrolyzable group bonded to silicon. Such organosilanes for use herein include, but are not limited to, 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropylsilanetriol, 3-aminopropyltrimethoxysilane, 3-aminopropyltriethoxysilane, 3-aminopropylsilanetriol, and mixtures thereof, and any of their self-condensation products (e.g., homopolymers having any chain length distribution).

As used herein, the term "thin film" or "coating" (used interchangeably herein) takes on its ordinary meaning in surface chemistry. For purposes herein, a "thin film" is a layer, having from atomic-scale to micron-scale thickness, disposed on a substrate. The substrate herein may be more simply referred to as a surface, although it should be understood the surface is part of a larger substrate. The systems and methods herein include the quantification of silane and/or titanium thin films disposed on surfaces. The surfaces for use herein are not limited in any way, and may include such materials as plastics, glass, metals, ceramics, wood, paper, and composites such as Formica®. Formica® is understood to be a decorative laminate product composed of several layers of kraft paper impregnated with a melamine thermosetting resin, topped with a decorative layer protected by melamine. The laminate is compressed and cured with heat. Thus, a silane or titanium coating on a Formica® surface herein is understood to be a silane or titanium thin film disposed on a paper and melamine resin laminate. In many ways, a Formica® surface is a plastic surface, wherein the plastic comprises melamine. An "antimicrobial thin film" of interest herein exhibits at least some level of residual antimicrobial efficacy, and the presence of such a thin film on a surface is an indication the surface will provide at least some reduction in organism count when the surface is inoculated with an organism.

In various embodiments, an antimicrobial thin film herein comprises dimethyloctadecyl 3-(trimethoxysilyl)propyl ammonium chloride. In water, this material likely exists as the silanetriol, i.e., 3-(trihydroxysilyl)propyl dimethyloctadecyl ammonium chloride. In various examples, an antimicrobial coating composition is made by diluting dimethyloctadecyl 3-(trimethoxysilyl)propyl ammonium chloride in water. A non-limiting commercial source of dimethyloctadecyl 3-(trimethoxysilyl)propyl ammonium chloride is Sigma-Aldrich, in the form of a 42 wt. % actives solution in methanol. In other examples, an antimicrobial coating composition is made by diluting 3-(trihydroxysilyl)propyl dimethyloctadecyl ammonium chloride in water. In various examples, the coating is applied to a surface and dried to form the antimicrobial thin film.

In various embodiments, an antimicrobial thin film herein comprises 3-(trihydroxysilyl)propyl dimethyloctadecyl ammonium chloride. 3-(trihydroxysilyl)propyl dimethyloctadecyl ammonium chloride is commercially available from INDUSCO, Inc. in 0.5 wt. %, 0.75 wt. %, 1.5 wt. %, 5.0 wt. % and 71.20 wt. % aqueous solutions, under the trade name BioShield®. The 5 wt. % solution of 3-(trihydroxysilyl) propyl dimethyloctadecyl ammonium chloride is also available from INDUSCO, Inc. under the trade name ProShield® 5000D, having EPA Reg. No. 53053-8. The label for ProShield® 5000D further lists the active ingredient as "octadecylaminodimethyltrihydroxysilyl propyl ammonium chloride," (which is perhaps an incorrect name for 3-(trihydroxysilyl)propyl dimethyloctadecyl ammonium chloride). Another supplier of 5 wt. % aqueous octadecylaminodimethyltrihydroxysilyl propyl ammonium chloride is Gelest, Inc., 11 East Steel Rd., Morrisville, Pa. 19067 USA. The Gelest MSDS discloses this product as containing 94-96 wt. % water and 4-6 wt. % octadecylaminodimethyltrihydroxysilyl propyl ammonium chloride. These various commercial materials may be used "as is" or diluted with water and/or other solvents as necessary to obtain the desired finished weight percent concentration of quaternary silane, e.g., for example, 0.75 wt. %. In various aspects, the composition is applied to a surface and dried to form an antimicrobial thin film.

In various embodiments, an antimicrobial thin film herein comprises a mixture of dimethyloctadecyl 3-(trimethoxysilyl)propyl ammonium chloride and at least one amine.

In various embodiments, an antimicrobial thin film herein comprises at least one amine having structure $R^9R^{10}R^{11}N$ wherein $R^9$, $R^{10}$, and $R^{11}$ are independently H, alkyl, substituted alkyl, aryl, substituted aryl or cyclic. In certain examples, an organic amine comprises diethanolamine or triethanolamine.

In certain aspects, an antimicrobial thin film herein comprises a secondary or tertiary amine. In certain examples, an antimicrobial thin film herein comprises may comprise dimethyloctadecyl 3-(trimethoxysilyl)propyl ammonium chloride and triethanolamine or diethanolamine. In certain examples, an antimicrobial coating composition comprises a mixture of from about 0.5 wt. % to about 1.0 wt. % dimethyloctadecyl 3-(trimethoxysilyl)propyl ammonium chloride. In various examples, an antimicrobial coating composition further comprises from about 0.01 wt. % to about 0.10 wt. % triethanolamine. The coating composition is applied to a surface and dried to form an antimicrobial thin film.

In various embodiments, an antimicrobial coating composition comprises about 0.75 wt. % dimethyloctadecyl 3-(trimethoxysilyl)propyl ammonium chloride; about 0.045 wt. % triethanolamine; and about 99.205 wt. % water. The coating composition is applied to a surface and dried to form an antimicrobial thin film.

In various embodiments, an antimicrobial thin film comprises 3-(trihydroxysilyl)propyl dimethyloctadecyl ammonium chloride and at least one amine. In certain aspects, the amine may be a secondary or tertiary amine. For example, an antimicrobial thin film may comprise 3-(trihydroxysilyl) propyl dimethyloctadecyl ammonium chloride and triethanolamine or diethanolamine. In certain examples, an antimicrobial coating composition comprises an aqueous mixture of from about 0.5 wt. % to about 1.0 wt. % 3-(trihydroxysilyl)propyl dimethyloctadecyl ammonium chloride. In various examples, an antimicrobial coating composition comprises from about 0.01 wt. % to about 0.10 wt. % triethanolamine. The antimicrobial coating composition is applied to a surface and dried to form an antimicrobial thin film for analysis herein.

In various embodiments, an antimicrobial coating composition comprises about 0.75 wt. % 3-(trihydroxysilyl) propyl dimethyloctadecyl ammonium chloride; about 0.045 wt. % triethanolamine; and about 99.205 wt. % water. The antimicrobial coating composition is applied to a surface and dried to form an antimicrobial thin film for analysis herein.

In various embodiments, an antimicrobial coating composition comprises an aqueous mixture of dimethyloctadecyl 3-(trimethoxysilyl)propyl ammonium chloride, at least one amine, and 3-chloropropyltrimethoxysilane and/or 3-chloropropylsilanetriol. Some commercially sourced dimethyloctadecyl 3-(trimethoxysilyl)propyl ammonium chloride or 3-(trihydroxysilyl)propyl dimethyloctadecyl ammonium chloride may contain small amounts of 3-chloropropyltrimethoxysilane. A commercial synthesis of dimethyloctadecyl 3-(trimethoxysilyl)propyl ammonium chloride comprises the $S_N2$ reaction between dimethyloctadecylamine and 3-chloropropyltrimethoxysilane. In some embodiments, an excess of 3-chloropropyltrimethoxysilane may be used to drive this reaction to completion. If not separated out from the reaction product mixture, the unreacted 3-chloropropyltrimethoxysilane may remain in the sample of dimethyloctadecyl 3-(trimethoxysilyl)propyl ammonium chloride. For example, a commercial source of 3-(trihydroxysilyl)propyl dimethyloctadecyl ammonium chloride may be disclosed to comprise 5.0 wt. % 3-(trihydroxysilyl)propyl dimethyloctadecyl ammonium chloride and 1.0 wt. % 3-chloropropyltrimethoxysilane. The antimicrobial coating composition is applied to a surface and dried to form an antimicrobial thin film for analysis herein.

In various embodiments, an antimicrobial coating composition comprises 3-chloropropyltrimethoxysilane and dimethyloctadecyl 3-(trimethoxysilyl)propyl ammonium chloride and/or 3-(trihydroxysilyl)propyl dimethyloctadecyl ammonium chloride. In various examples, 3-chloropropyltrimethoxysilane may be added to a solution of dimethyloctadecyl 3-(trimethoxysilyl)propyl ammonium chloride and/or 3-(trihydroxysilyl)propyl dimethyloctadecyl ammonium chloride known to not comprise any 3-chloropropyltrimethoxysilane as a byproduct. In other examples, additional 3-chloropropyltrimethoxysilane may be added to a solution of dimethyloctadecyl 3-(trimethoxysilyl)propyl ammonium chloride and/or 3-(trihydroxysilyl)propyl dimethyloctadecyl ammonium chloride known to include some residual 3-chloropropyltrimethoxysilane as a byproduct. The antimicrobial coating composition is applied to a surface and dried to form an antimicrobial thin film for analysis herein.

In various embodiments, an antimicrobial coating composition comprises from about 0.5 wt. % to about 1.0 wt. % dimethyloctadecyl 3-(trimethoxysilyl)propyl ammonium chloride; from about 0.05 to about 0.5 wt. % 3-chloropropyltrimethoxysilane and from about 0.01 wt. % to about 0.10 wt. % triethanolamine, with the remainder being water. The antimicrobial coating composition is applied to a surface and dried to form an antimicrobial thin film for analysis herein.

In various embodiments, an antimicrobial coating composition comprises from about 0.5 wt. % to about 1.0 wt. % 3-(trihydroxysilyl)propyl dimethyloctadecyl ammonium chloride; from about 0.05 to about 0.5 wt. % 3-chloropropyltrimethoxysilane and from about 0.01 wt. % to about 0.10 wt. % triethanolamine, with the remainder being water. The antimicrobial coating composition is applied to a surface and dried to form an antimicrobial thin film for analysis herein.

In various embodiments, an antimicrobial coating composition comprises about 0.75 wt. % dimethyloctadecyl 3-(trimethoxysilyl)propyl ammonium chloride; about 0.06 wt. % 3-chloropropyltrimethoxysilane; about 0.045 wt. % triethanolamine; and about 99.145 wt. % water. When applied to a portion of a surface and allowed to dry, this composition provides a biostatic coating. In various embodiments, the treated surface comprises a mixture of quaternary and 3-chloropropyl surface bound silanes.

In various embodiments, an antimicrobial coating composition comprises about 0.75 wt. % 3-(trihydroxysilyl)propyl dimethyloctadecyl ammonium chloride; about 0.06 wt. % 3-chloropropyltrimethoxysilane; about 0.045 wt. % triethanolamine; and about 99.145 wt. % water. When applied to a portion of a surface and allowed to dry, this composition provides a biostatic coating. In various embodiments, the treated surface comprises a mixture of quaternary and 3-chloropropyl surface bound silanes.

In various embodiments, an antimicrobial coating composition comprises about 0.75 wt. % dimethyloctadecyl 3-(trimethoxysilyl)propyl ammonium chloride; about 0.12 wt. % 3-chloropropyltrimethoxysilane; about 0.045 wt. % triethanolamine; and about 99.085 wt. % water. When applied to a portion of a surface and allowed to dry, this composition provides a biostatic coating. In various embodiments, the treated surface comprises a mixture of quaternary and 3-chloropropyl surface bound silanes.

In various embodiments, an antimicrobial coating composition comprises about 0.75 wt. % 3-(trihydroxysilyl)propyl dimethyloctadecyl ammonium chloride; about 0.12 wt. % 3-chloropropyltrimethoxysilane; about 0.045 wt. % triethanolamine; and about 99.085 wt. % water. When applied to a portion of a surface and allowed to dry, this composition provides a biostatic coating. In various embodiments, the treated surface comprises a mixture of quaternary and 3-chloropropyl surface bound silanes.

In various embodiments, an antimicrobial coating composition comprises about 0.75 wt. % dimethyloctadecyl 3-(trimethoxysilyl)propyl ammonium chloride; about 0.26 wt. % 3-chloropropyltrimethoxysilane; about 0.045 wt. % triethanolamine; and about 98.945 wt. % water. When applied to a portion of a surface and allowed to dry, this composition provides a biostatic coating. In various embodiments, the treated surface comprises a mixture of quaternary and 3-chloropropyl surface bound silanes.

In various embodiments, an antimicrobial coating composition comprises about 0.75 wt. % 3-(trihydroxysilyl)propyl dimethyloctadecyl ammonium chloride; about 0.26 wt. % 3-chloropropyltrimethoxysilane; about 0.045 wt. % triethanolamine; and about 98.945 wt. % water. When applied to a portion of a surface and allowed to dry, this composition provides a biostatic coating. In various embodiments, the treated surface comprises a mixture of quaternary and 3-chloropropyl surface bound silanes.

In various embodiments, a surface is treated with an antimicrobial coating composition comprising: about 0.75 wt. % 3-(trihydroxysilyl)propyl dimethyloctadecyl ammonium chloride; about 0.045 wt. % triethanolamine; and about 99.205 wt. % water and allowed to visibly dry. In one non-limiting example, borosilicate glass slides were positioned vertically, and electrostatic spray coated from a distance of about 5 to 6 feet with this composition. The treated slides were allowed to dry at room temperature overnight. AFM imaging (49 μm×74 μm scan area) revealed the silane/triethanolamine coating to have an average thickness of 22.12±3.28 nm, and an average roughness of 19.85±5.62 nm.

In various embodiments, an antimicrobial coating is prepared on a portion of a surface by a method comprising: (1) coating the portion of the surface with an aqueous mixture comprising 3-(trihydroxysilyl)propyl dimethyloctadecyl ammonium chloride; triethanolamine; and water; and (2) coating the same portion of the surface with aqueous peroxotitanium acid and peroxo-modified anatase sol, in either order (i.e., (1) then (2), or (2) then (1)). Not wishing to be bound by any particular theory, the peroxotitanium acid and peroxo-modified anatase sol coating may assist in adhering the 3-(trihydroxysilyl)propyl dimethyloctadecyl ammonium chloride to the portion of the surface, and/or may increase the hydrophilicity of the portion of the surface previously made hydrophobic by surface bound 3-(trihydroxysilyl)propyl dimethyloctadecyl ammonium chloride. Either of these phenomena are possible regardless of the order of disposition on the portion of the surface. In various examples, XRF spectrometry is used to determine the amount of $_{14}$Si and/or $_{22}$Ti atoms in the thin film coating.

In various embodiments, an antimicrobial coating is prepared on a surface by a method comprising: (1) coating a portion of the surface with an aqueous mixture comprising: 0.75 wt. % 3-(trihydroxysilyl)propyl dimethyloctadecyl ammonium chloride; 0.045 wt. % triethanolamine; and 99.205 wt. % water; and (2) subsequently coating the portion of the surface with 0.85 wt. % aqueous peroxotitanium acid and peroxo-modified anatase sol. In a non-limiting example, borosilicate glass slides were positioned vertically, and electrostatic spray coated from a distance of about 5 to 6 feet with the aqueous 3-(trihydroxysilyl)propyl dimethyloctadecyl ammonium chloride and triethanolamine solution and allowed to dry about 3 to 5 minutes, after which time the 0.85 wt. % aqueous peroxotitanium acid and peroxo-modified anatase sol was electrostatic spray coated overtop of the organosilane from about 5 to 6 feet distance. The treated slides were left to dry at room temperature overnight. AFM imaging (50 µm$^2$ scan area) revealed that the coating resulting from this two-step sequential surface treatment had an average thickness of 51.79±17.98 nm, and an average roughness of 35.90±9.43 nm. In various examples, XRF spectrometry is used to determine the amount of $_{14}$Si and/or $_{22}$Ti atoms in the thin film coating.

The method of stepwise surface treatment may be performed in the opposite order. For example, a portion of a surface may be coated first with an aqueous solution of peroxotitanium acid and peroxo-modified anatase sol, and then the same portion of the surface subsequently coated with an aqueous solution of 3-(trihydroxysilyl)propyl dimethyloctadecyl ammonium chloride and triethanolamine such that the organosilane is theoretically overtop the titanyl species. For either order of application, the first coating may be allowed to partly dry or completely dry prior to the subsequent coating. In other aspects, the first treatment may be applied, and while still wet, followed by the second treatment, and then the combined treatments are allowed to dry. Throughout this disclosure, stepwise treatment of a surface is meant to target approximately the same portion of the surface with successive compositions. In some instances, a second treatment may liquefy a coating applied first and dissolve those components that were first dried on the surface. In various examples, XRF spectrometry is used to determine the amount of $_{14}$Si and/or $_{22}$Ti atoms in the thin film coating, which can be correlated to the thickness, the weight per unit of surface area, and the antimicrobial efficacy of the thin film coating.

A unique situation arises when analyzing an organosilane antimicrobial coating on a glass surface using XRF. In this case, the substrate, being glass, is composed of high levels of silicon. Thus, detection of a difference in the level of $_{14}$Si peak intensities by XRF before and after treatment of a glass surface is not possible. In these instances, one option is to use a titanium coating in conjunction with the silane coating, such as a sealant coating, and to measure the amount of $_{22}$Ti atoms in the coating rather than the $_{14}$Si levels. Since an XRF spectrum taken across a range of wavelengths can show both the $_{14}$Si and the $_{22}$Ti peaks in the spectrum, the analysis becomes straightforward, and the operator can just pay attention to the $_{22}$Ti peak knowing that the $_{14}$Si peak is unreliable since its intensity is due in part to the glass substrate. In specific embodiments where the antimicrobial coating on glass comprises a silane having a quaternary ammonium chloride substituent, $_{17}$Cl photon counts may be obtained instead of $_{22}$Ti counts.

EXAMPLES

Antimicrobial Coating Composition, Test Coupons and Spray Coating Methods

The antimicrobial coating composition for the examples (abbreviated as 2015) consisted essentially of: 0.75 wt. % 3-(trihydroxysilyl)propyl dimethyloctadecyl ammonium chloride, 0.12 wt. % 3-chloropropyltrimethoxysilane, 0.045 wt. % triethanolamine, remainder water, with the weight percentages based on the total weight of the composition.

A series of 1" by 1" annealed coupons (glass, metals or plastics, as indicated) were coated with the 2015 product. To maximize the uniformity of coating the test coupons in a laboratory setting, a robotic slider was equipped with an electrostatic sprayer and a group of coupons arranged in a tight pattern were sprayed in different passes of the sprayer. The coating procedure comprised spraying the antimicrobial coating composition as a fine mist from the electrostatic spray gun at a distance of about 3 feet onto the test coupons and allowing the surfaces to dry at room temperature overnight. A plurality of test coupons were sprayed at the same time with the coupons grouped together, typically in a 4 coupon×15 coupon rectangular grid. In various tests, each row of 15 coupons may be assigned to a group of replicates, Group 1, Group 2, Group 3 and Group 4. An application "cycle" refers to one spray application as per above. Multiple cycles indicate repeated applications of the 2015 composition, which will necessarily build up a heavier film on the test coupons. This process of accumulating material by repeating the application cycle can be monitored by weight measurement or by XRF. Spraying of surfaces in the field, including examples where test coupons were placed on objects outside of a laboratory setting, are described below with the associated example.

The Handheld XRF Device and Software

The hand-held X-Ray Fluorescence Spectroscopy (XRF) analyzer used was a Bruker Tracer 5i spectrometer, having a range from $_9$F to $_{92}$U. The system uses a 20 mm$^2$ silicon drift detector with <140 eV @ 250,000 cps Mn Kα resolution for optimum light element analysis. Rhodium thin window X-ray tube is the excitation source and the instrument is equipped with an 8 µm beryllium detector window. The acquired data were analyzed with Bruker's ARTAX-Control XRF software. In various embodiments, the Bruker Titan 51 XRF analyzer can be used, having a range of $_{12}$Mg to $_{92}$U. For a brief discussion on interpreting XRF data, see A. Shugar, "Peaking Your Interest: An introductory explanation of how to interpret XRF data," *WAAC Newsletter*, (Western Association of Art Conservation), 31(3), 8-10, September 2009, (http://cool.conservation-us.org/waac/wn/wn31/wn31-3/index.html).

XRF Optimization and Developing a Universal Calibration Curve

Developing an XRF method useful for analyzing antimicrobial coatings on surfaces includes, but is not limited to, optimization of scanning time, voltage and current, and addressing background (BG) signals from different surfaces under the coating. Ultimately, a universal calibration curve is developed that can convert measured photon count readings (e.g., $_{14}$Si, $_{17}$Cl, and/or $_{22}$Ti) from an antimicrobial coating into coating thickness, coating weight/unit of surface area, and a predicted level of antimicrobial efficacy expected from the antimicrobial coating. The measuring of $_{14}$Si, $_{17}$Cl, and/or $_{22}$Ti photon counts is not meant to be limiting, as other elements known to present in an antimicrobial coating may be analyzed by XRF in accordance to the methods herein, depending for example on the nature of the substrate beneath the coating that may result in unmanageable background signals. In examples where an antimicrobial coating comprises a quaternary ammonium salt, a silane comprising a quaternary ammonium salt, or even simply a salt, various halogens may be quantified by XRF and the photon counts interpolated into expected antimicrobial efficacy of the coating. In some instances, a salt may be added to a coating composition as a marker, even if not having any antimicrobial efficacy. In various embodiments, a halogen is quantified by XRF, including $_{17}Cl$, $_{35}Br$ and $_{53}I$. For example, an antimicrobial coating may comprise 3-(trihydroxysilyl)propyl dimethyloctadecyl ammonium chloride, 3-(trihydroxysilyl)propyl dimethyloctadecyl ammonium bromide, or 3-(trihydroxysilyl)propyl dimethyloctadecyl ammonium iodide, in which case XRF may be used to quantify $_{17}Cl$, $_{35}Br$ or $_{53}I$, respectively, in place of, or in addition to, quantification of the $_{14}Si$ present.

Example 1: Proof of Concept

Figure 1:
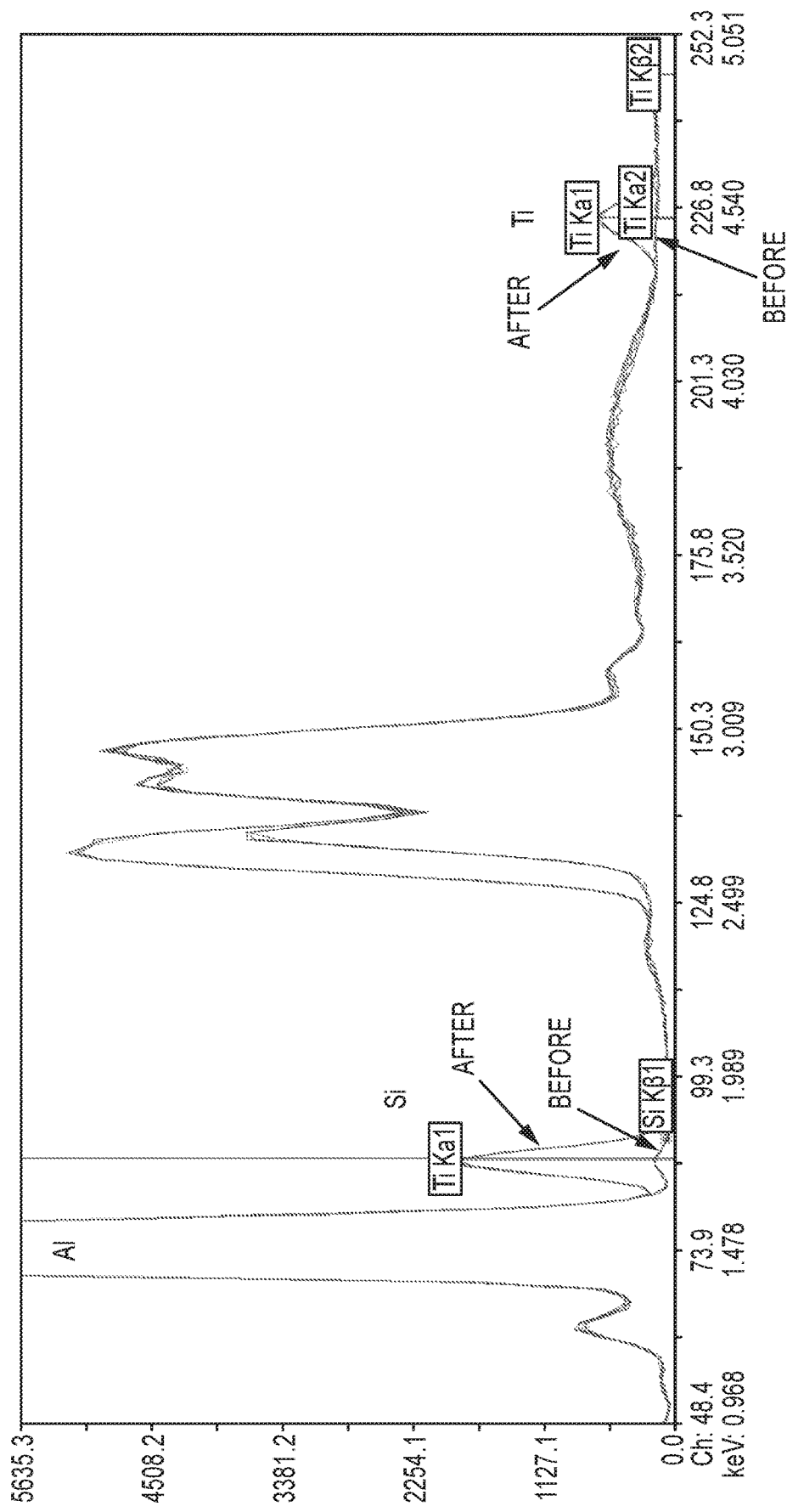
FIG. 1 shows an XRF spectrum of a thin film comprising an organosilane and a titanium-sol on an aluminum coupon, before and after coating. Samples were scanned three times and the image shows an overlay of all six spectra.

Aluminum coupons were sequentially coated with the 2015 organosilane antimicrobial coating composition above followed by a titanium-sol composition consisting essentially of 0.85 wt. % of a mixture of peroxotitanium acid and peroxo-modified anatase sol, remainder water, according to the spray application protocol above. The XRF spectra of the resulting thin film are shown in FIG. 1, wherein "before" indicates the coupon prior to coating and "after" indicates the coupon after coating, As shown in the spectra of FIG. 1, the peak intensities for the silicon, titanium and aluminum elements can be seen both before and after coating. For this example, each sample was scanned three times, with the spectra in FIG. 1 representing an overlay of all six spectra. As shown in FIG. 1, both the $_{14}Si$ and $_{22}Ti$ peaks are not interfered with by the aluminum, but instead are clearly usable as shown by the stark difference in $_{14}Si$ and $_{22}Ti$ peak intensities for uncoated versus coated aluminum. As demonstrated, the $_{14}Si$ or $_{22}Ti$ peak intensities can be used to determine the amount of thin film coating on the surface, and the amount remaining on the surface after environmental wear, to provide an estimate of the expected residual antimicrobial efficacy from the thin film coating.

Figure 2:
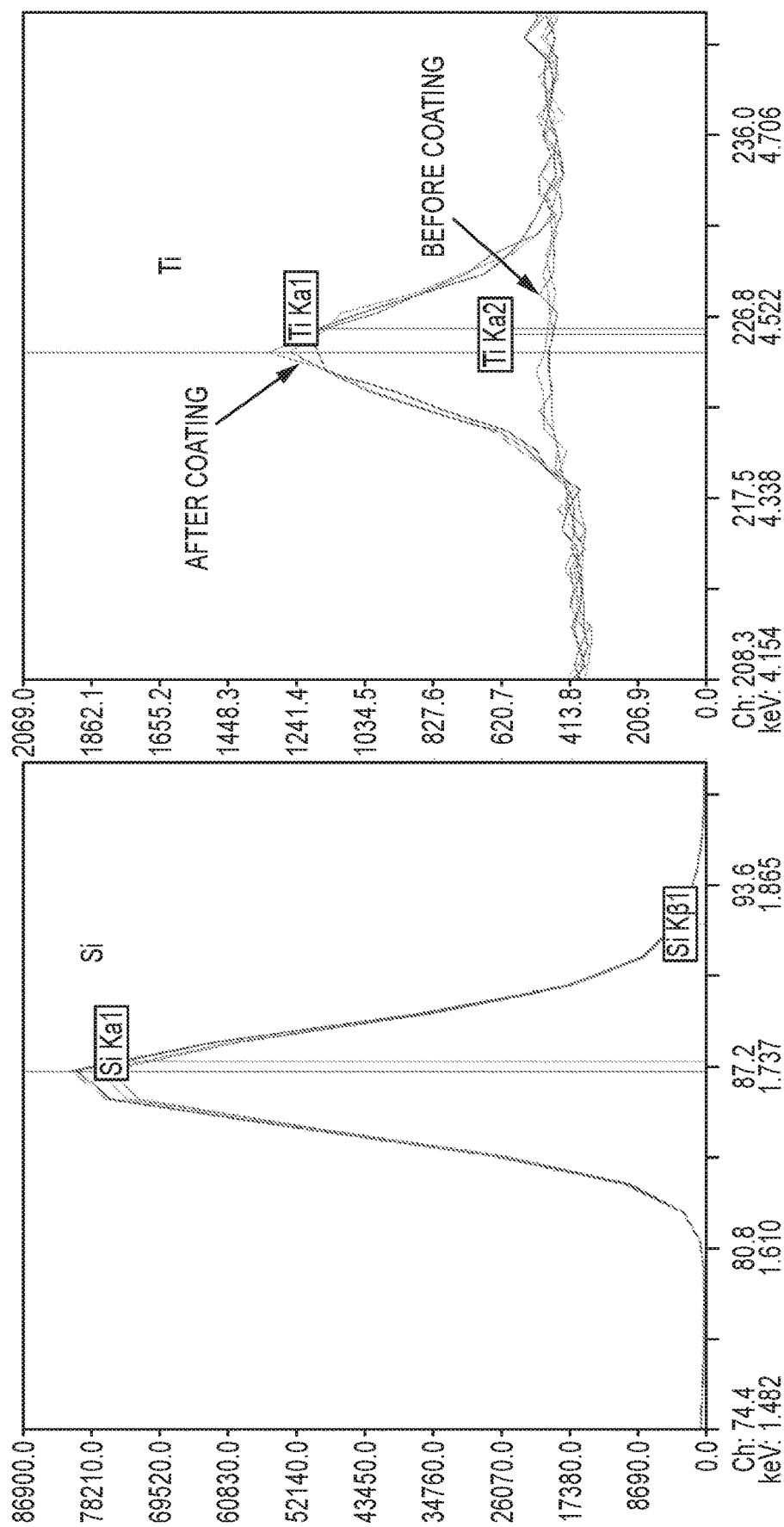
FIG. 2 shows $_{14}$Si and $_{22}$Ti XRF spectra before and after a thin film comprising both an organosilane and titanium-sol is applied to glass. The overlaid spectra demonstrate that $_{22}$Ti provides a useful measurement of the film on glass, whereas $_{14}$Si does not because of the presence of silicon atoms in the glass substrate.

Example 2: Background Considerations—Antimicrobial Coating on Silica Glass Surfaces Glass coupons were sequentially coated with the 2015 antimicrobial coating composition and a titanium-sol composition per above. The XRF spectra of the resulting thin film are shown in FIG. 2, wherein peak intensities for the silicon and titanium elements can be seen both before and after coating. This example demonstrates that the $_{22}Ti$ peak intensities find use for assessing the antimicrobial coating containing titanium on the glass surface, whereas the $_{14}Si$ peak intensities are not useful because of the interference from the silicon atoms in the glass substrate. From the spectra on the left side of the figure, one can see that there is no discernable difference in the $_{14}Si$ peak intensities between an uncoated glass slide and a coated glass slide because of the high $_{14}Si$ peak intensity from the underlying glass substrate. From the spectra on the right side of the figure, one can see that there is a discernable difference in the $_{22}Ti$ peak intensities between an uncoated glass slide and a coated glass slide because there is no titanium in the glass substrate to interfere with the assessment of the coating that contains a titanium species.

Figure 3:
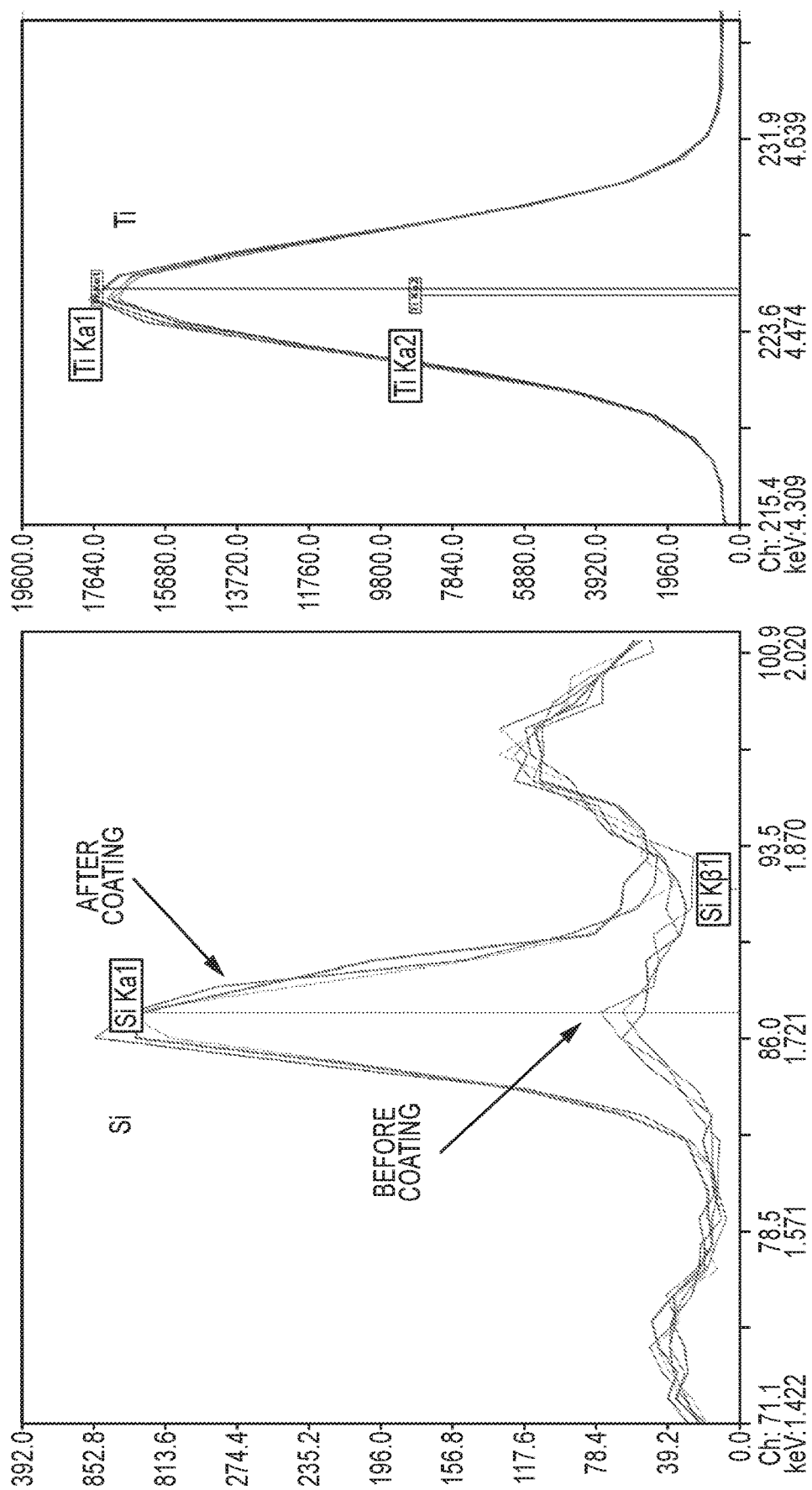
FIG. 3 shows $_{14}$Si and $_{22}$Ti XRF spectra before and after a thin film comprising both an organosilane and titanium-sol is applied to white HDPE. The spectra demonstrate that $_{14}$Si provides a useful measurement of the film on the white plastic, whereas $_{22}$Ti does not because of the presence of $TiO_2$ in the pigmented plastic substrate.

Example 3: Background Considerations—Antimicrobial Coating on White Pigmented Plastic Surfaces White pigmented high density polyethylene (HDPE) coupons were sequentially coated with the 2015 antimicrobial coating composition and the titanium-sol composition per above. The XRF spectra of the resulting thin film are shown in FIG. 3, wherein peak intensities for the silicon and titanium elements can be seen both before and after coating. This example demonstrates that the $_{14}Si$ peak intensities find use for assessing the antimicrobial coating on the HDPE surface, whereas the $_{22}Ti$ peak intensities are not of any use because of the interference from the $TiO_2$ pigment present in the white plastic substrate. From the spectra on the left side of the figure, one can see that there is an easily discernable difference in the $_{14}Si$ peak intensities between an uncoated white HDPE slide and a coated white HDPE slide because of no silicon atoms in the underlying plastic substrate. From the spectra on the right side of the figure, one can see that there is no discernable difference in the $_{22}Ti$ peak intensities between an uncoated white HDPE slide and a coated white HDPE slide because of the presence of $TiO_2$ pigment in the white plastic substrate.

Example 4: Scanning Duration Time

Figure 4:
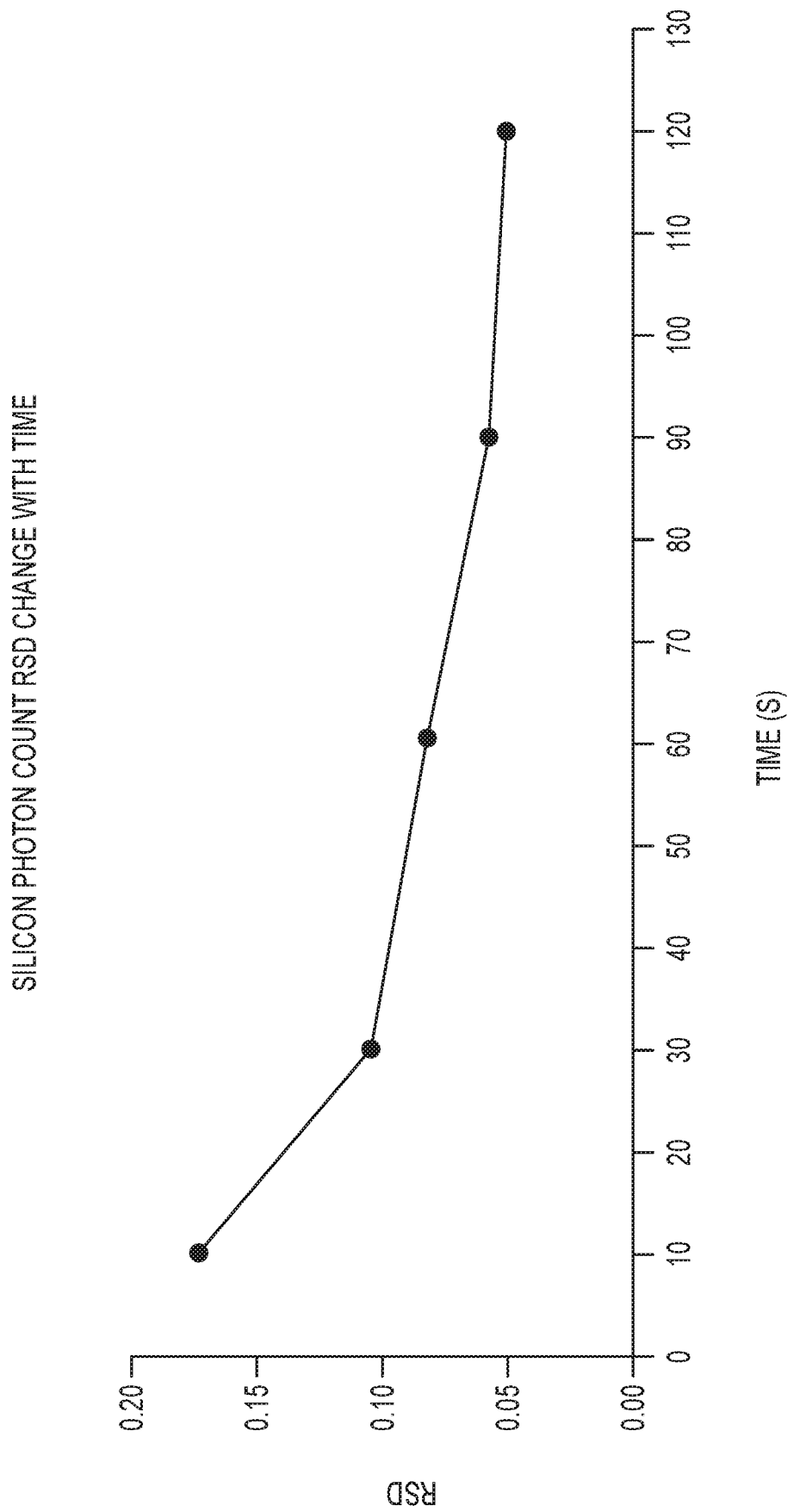
FIG. 4 shows a plot of relative standard deviation (RSD) versus scanning time demonstrating an increase in the precision of the data with increasing scanning time.
Figure 5:
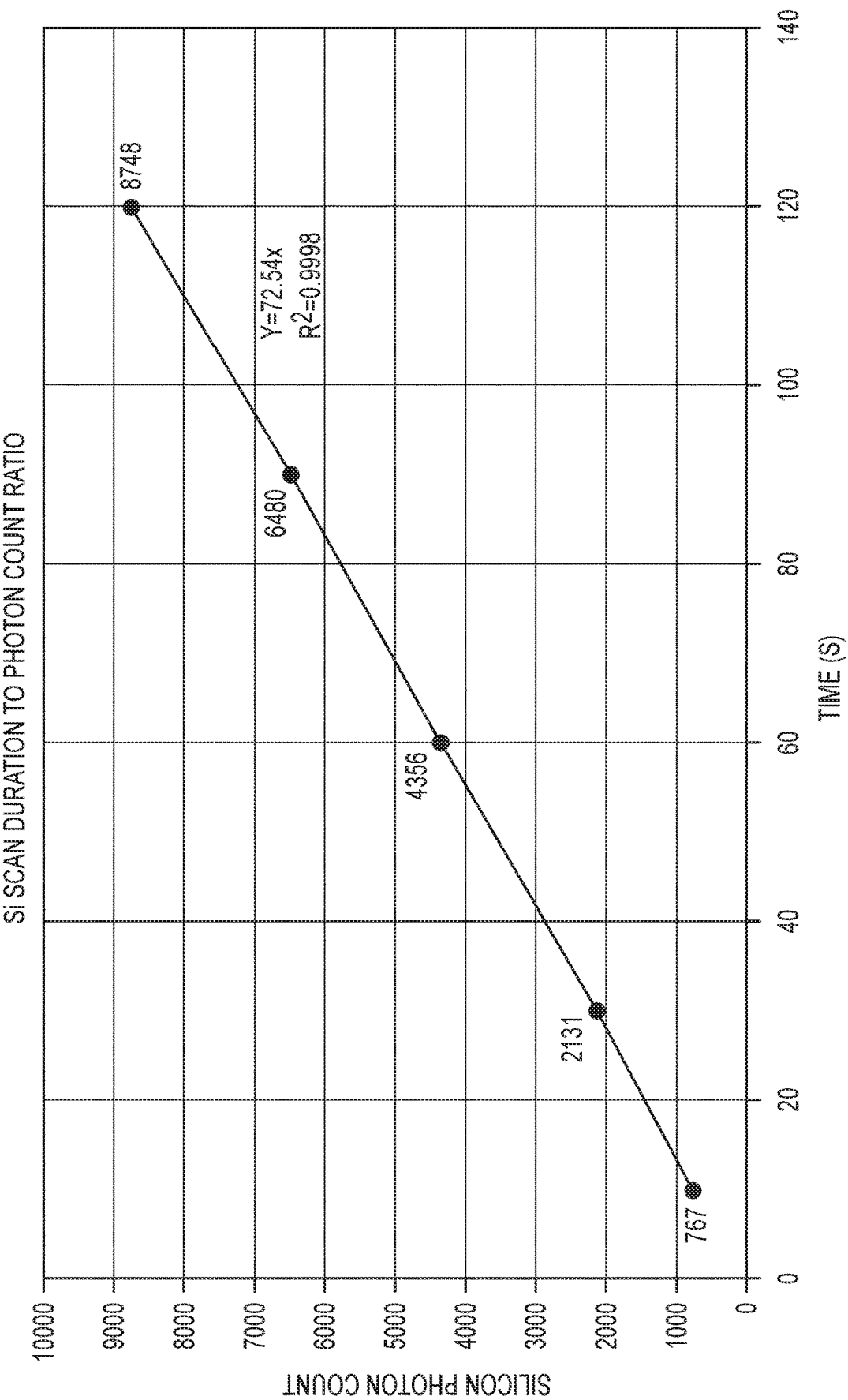
FIG. 5 shows a plot of silicon photon count versus scanning time, with linearity demonstrating a constant ratio of silicon photon count to scanning duration.

A stainless-steel coupon was scanned at 3 different spots with scanning durations varying from 10 seconds to 120 seconds and the corresponding $_{14}Si$ photon counts were obtained. The relative standard deviation (RSD) can be an indicator of the closeness of the acquired data. As shown in FIG. 4, increasing scanning time of the XRF analyzer improves the precision of the data. Due to practical reasons, a compromise is made so that an operator can analyze a coating in a particular location in a reasonable amount of time. For example, 10 seconds scanning duration seems to be the most reasonable choice for a large sample size. Evidently, the ratio of silicon photon count to the scanning duration appears to be constant, as shown by the linearity of the $_{14}Si$ photon count versus scanning time graph in FIG. 5. This observation is critical regarding normalization of the data acquired with different scanning durations.

Example 5: Effects of Current and Voltage in the Analyzer

The available range for voltage depends on the chosen value for current and vice versa. In this experiment, voltage and scanning time were kept constant at 10 kV and 10 seconds respectively and the scanning was of a blank (uncoated) glass test coupon. The current was increased from 5 to 180 µA. The results shown in FIG. 6 indicate a generally linear relation between current and photon count, but particularly so in the mid-range of the plot. From the substantially linear portion seen in FIG. 6, from about 50 µA to about 100 µA, 50 µA appears to be the lowest suitable current for differentiating silicon peaks without overheating the instrument with unnecessarily high current.

As shown in FIG. 7, varying the voltage from about 6 kV to about 40 kV while maintaining a constant current of about 50 µA showed a spike in the photon count around 20 kV, however there was no significant advantage seen in the RSD. Therefore, 10 kV was believed optimal and was chosen for the rest of the experiments.

Example 6: Sampling Size and Averaging

Ideally, XRF scanning should provide assessment of the coverage of a across a surface. However, the measuring area for a handheld XRF analyzer is about an 8 mm diameter spot. To assess advantages to repeating measurements of the same area or different areas and the advantages to averaging, a large plastic surface without any coating was scanned by XRF. The uncoated surface was selected for its consistency in background materials. As shown by the left five bars in the bar graph of FIG. 8 (spots 1 . . . 5), each of five distinct 8 mm spots, spaced apart from each other on the plastic surface by about 50 cm to about 100 cm, were scanned 5 separate times. The error bars shown on the left five bars indicates the variations between the 5 scans for each spot. Alternatively, and as shown by the right five bars in the bar graph of FIG. 8, each bar represents the scanning of one spot only once. The five bars collectively show each of 5 spots scanned once. The error bars shown at the top of the five right bars indicate variation between the spots.

Example 7: Compatibility of Various Surfaces Underneath Antimicrobial Coatings To be able to analyze antimicrobial coatings such as 2015 on surfaces other than stainless steel, the present method was tested for compatibility with various materials, both metallic and non-metallic. A variety of substrate materials found in healthcare facilities were coated with the 2015 silane antimicrobial coating and analyzed with the XRF analyzer. The plastics that were coated and the coatings subsequently analyzed included acrylonitrile butadiene styrene (ABS), high density polyethylene (HDPE), faux leather (vinyl, likely comprising a mixture of materials), polyoxymethylene (acetal), polycarbonate (PC), polypropylene (PP), polyamide (nylon), polytetrafluoroethylene (PTFE), and polymethylmethacrylate (acrylate). The metals that were coated and the coatings subsequently analyzed included 304 stainless steel, 316 stainless steel, 464 brass, 260 brass, 1100 aluminum, 2024 aluminum, zinc, copper and titanium. After optimization and subtraction of the background signal (as indicated by the table entries "−BG," meaning "minus the background BG signal"), calibration curves were obtained for each material type. As seen in FIG. 9 (variety of plastics) and FIG. 10 (variety of metals), the similarity between the slopes of $_{14}Si$ photon count versus $mg/in^2$ for the silane coating on a variety of different materials suggests that a universal calibration curve is achievable. However, as seen in Example 2 for glass, analysis of a silane antimicrobial coating on substrates bearing a high silicon content (e.g., glass, ceramic tiles, marbles, silicon rubber) remains problematic.

Example 8: Actual Weight Versus Predicted Weight of Coatings on Various Surfaces In this example, information was collected from actual spraying in the field, as proof the XRF method and the calibration curve are applicable to a real-life environment where various objects are sprayed in order to coat with an antimicrobial coating. For the first part of this example, pre-weighed 1"×1" stainless steel coupons were placed on each of a variety of surfaces on familiar objects. The purpose of using standard test coupons on various real-life surfaces was to remove any variability caused by differences in materials and their associated background signals. The surfaces were coated with the 2015 antimicrobial coating composition, impinging on the test coupons placed thereon, and allowed to dry. The test coupons were collected from the various surfaces and the handheld XRF analyzer was used to measure $_{14}Si$ photon counts. These counts were converted to a predicted weight of coating using the calibration curve of $_{14}Si$ photon counts versus weight in $mg/in^2$. The bar chart of FIG. 11 shows comparisons between actual weight (i.e., measured weight) and predicted coating weight (i.e., determined from XRF readings and interpolation on the calibration curve).

For the second part of this example, the surfaces in close proximity to the previously placed test coupons were scanned using XRF. The test coupons placed on the surfaces provided the actual weight/$in^2$, whereas the XRF photon counts of the surfaces around where the test coupons were placed provided predicted weight/$in^2$. The $_{14}Si$ photon counts thus obtained were converted to a predicted coating weight in $mg/in^2$ using the calibration curve ("direct scan"). The corresponding test coupon of the same or similar material was analytically weighed to determine the weight of coating ("coupons"). The results are provided in the bar graph of FIG. 12. This example shows the utility of XRF for assessment of coating weight in the field where the objects cannot be physically moved and/or directly weighed.

Example 9: Calibration

Comparison of the amount of the 2015 antimicrobial coating (in $mg/in^2$) and the XRF silicon photon count provided the calibration curve set forth in FIG. 13 having a high degree of linearity ($R^2=0.9959$) especially for surfaces coated with less than about 1 $mg/in^2$ antimicrobial coating. Reliability in the method seems to trail off above about 4.0 $mg/in^2$ of antimicrobial coating, which is far more coating than one would practically apply to surfaces in an institution. Typical coating weights using the 2015 antimicrobial coating composition and an electrostatic sprayer for coating hospital furnishings is about 0.12 $mg/in^2$.

The data to construct the calibration curve of FIG. 13 was obtained by coating grids of 4 coupons×15 coupons, using the robotic sprayer, with the coupons being 1"×1" brushed 304 stainless steel. Each column of 4 coupons were removed from the grid after 2, 4, 6, 8, 10, 12, 16, 20, 24, 30, 36, 42, 50, 60 and 70 passes of the sprayer. Each of the four coupons in a column represented four replicates. The experiment was repeated twice, i.e., two grids of 4 coupons×15 coupons, and the two sets of test results averaged. Having two sets of results showed the method to be reproducible. Recognizing that the calibration curve is for Si-containing coatings on stainless steel, the Y-intercept, which depends on the background $_{14}Si$ counts, can be adjusted for different substrates. This aspect can be programmed into software customized for coating analysis in healthcare settings where there is likely both metal and plastic surfaces requiring antimicrobial coatings.

Example 10: Mechanical Abrasion of Coatings and Monitoring Loss of Coating

1. Proof of Concept:

Stainless-steel coupons were sequentially coated with the 2015 organosilane antimicrobial coating composition and the titanium-sol composition per the above examples. After an initial XRF spectrum was taken of the coating, the coated slide was inserted into an abrasion tester and abraded per the abrasion protocol described below. An XRF spectrum was recorded after each abrasion cycle, and all the spectra overlaid to produce the plot shown in FIG. 14. As shown in FIG. 14, the $_{14}$Si peak intensities provide a way to quantify the antimicrobial thin film as it is worn off the surface through mechanical abrasion. As explained below, mechanical abrasion in a laboratory setting mimics the frequent handling of surfaces. Modifications of the laboratory mechanical abrasion protocol can mimic the repeated cleaning of surfaces. Further examples of wear testing are disclosed herein below.

(i) Mechanical Abrasion Testing of Antimicrobial Surfaces

Antimicrobial coatings can be subjected to mechanical abrasion and XRF can be used to track a decrease in the amount of antimicrobial coating and predict the corresponding decrease in antimicrobial efficacy. Wear data are indicative of the durability of a coating and relate to how well an antimicrobial coating can withstand frequent handling or other environmental insult. For example, wear testing in the laboratory can mimic the repeated handling of a door knob. Or with cleaning solutions included in the laboratory wear testing, the laboratory method can mimic the repeated cleaning of a surface that was previously coated with an antimicrobial coating. An existing EPA Protocol may be used to generate the wear data in the laboratory. In certain instances, the EPA protocol may be modified, such as to add cleaners that might be used in an institution where various surfaces are coated with antimicrobial coatings.

EPA Protocol #01-1A, entitled "Protocol for Residual Self-Sanitizing Activity of Dried Chemical Residues on Hard, Non-Porous Surfaces," is a standard test method used for testing the durability of an antimicrobial coating on a hard surface. The test method utilizes an in-line abrasion machine commonly used in assessing the cleaning ability of detergents. However, instead of a standard soiled tile being positioned in the machine to be scrubbed, test coupons previously coated with an antimicrobial coating per the above spray method are positioned in the machine. The back-and-forth cycling of a weighted scrubber (a weighted "boat" with a cloth or sponge) simulates natural wearing of the antimicrobial coating, such as the wear the surface may experience when frequently handled. In variations of the test protocol, the cloth in the weighted boat may be moist to simulate the handling of surfaces with a moist hand, or wet with a cleaner to simulate cleaning of the surfaces. For moistening, the cloth was placed 75 cm away from the cleaner or water sprayer nozzle and was sprayed for 1 second. In various examples, correlations can be made to handling of environmental surfaces, e.g., a doorknob. At various wear cycles, coupons may be weighed for weight loss or inoculated with a test organism.

The abrasion tester suggested in the EPA protocol is a GardCo™ Washability and Wear Tester, Model D10V, Cat. No. # WA-2153, from the Paul N. Gardner Co., Inc., Pompano Beach, Fla., which is the machine used herein. Variables in the protocol include the weight of the boat, the material wrapped around the boat (e.g., a cloth wiper), the moisture level on the wiper, the speed of the oscillations, and the number of cycles, in addition to the type of antimicrobial coating on the test coupons, the test coupon material, and the arrangement of coated coupons in the machine (i.e., the pattern).

(ii) Abrasion Protocol

The action of abrasion of an antimicrobial thin film may be monitored by weight loss. 1"×1" stainless steel test coupons were used, each coupon weighed before and after coating, and before and after abrasion testing.

The wear testing is performed in replicates of two.

TexWipe® cotton wipers (VWR # TWTX309) were used with TexWipe® FoamWipe™ wipers (VWR # TWTX704) as a liner on the weighted boat.

The weight of the boat was adjusted to a total weight of 1.0 kg by adding auxiliary weights.

Using the GardCo™ Washability machine, a cycle refers to 2 passes of the weighted boat, there and back. Abrasion speed was set to "2.5," which equated to about 4-6 seconds per cycle.

The cotton wiper and foam liner were arranged in the weighted boat. The wiper was sprayed at a distance of 75 cm±1 cm with deionized water for 1 second using a Preval® Sprayer to moisturize the wiper. Abrasion testing was performed immediately after moisturizing the wiper.

The TexWipe® cotton wiper was replaced after each abrasion cycle.

Test coupons subjected to 10 cycles (10×) or 30 cycles (30×) are then measured for percent weight loss or inoculated with a test organism to measure residual antimicrobial efficacy.

2. Basic Abrasion to Model Frequent Handling of Coated Surfaces:

Abrasion of 2015 antimicrobial coatings prepared from the 2015 composition above on stainless steel coupons was followed by measuring $_{14}$Si photon counts with the XRF analyzer. In this example, the boat of the washability machine was either dry or wetted with water per the protocol above. The results are shown in FIG. 15 as plots of $_{14}$Si photon counts versus number of wear cycles for the three abrasion conditions—no weight on the boat, 500 g weight added to the boat, and 500 g weight added to the boat with the boat wrapped in a wipe wetted with water.

3. Abrasion to Model Washing of Coated Surfaces with Cleaners:

Another major objective of the method herein was to provide a tool for monitoring the wearing of the coating over time and to provide an estimation of the appropriate retreatment time, i.e., the time when a user should recoat the surface with antimicrobial coating. To better understand the wearing profile of the coating, the Gardco™ washability machine and the wear protocol was used to represent the effects of routine cleanings on an antimicrobial coating. It is reasonable to assume that surfaces in a healthcare setting, even if coated with an antimicrobial coating, will still be periodically washed in accordance with standard hygiene protocols.

To simulate wear and cleaning of surfaces, a series of 1" by 1" stainless steel coupons were coated with the 2015 antimicrobial coating composition as per above. The weighted boat on the Gardco™ machine was equipped with a cotton cloth. In series of tests, the cloth was sprayed with different common disinfectants (2 sprays from about 75 cm distance). Following each wearing cycle (each cycle=one back and one forward movement/pass of the boat) the samples were analyzed with the handheld XRF instrument. Using the previously obtained calibration curve, the coating coverage was predicted and plotted against the number of wearing cycles. The results suggest that the upper loose layers of antimicrobial coating wear off the steel surface with the first few cycles, and then the abrasion rate of the coating slows down significantly. Such observation supports the use of XRF as a method to monitor antimicrobial coating coverage and durability of the coatings over periods of time, including washing of the coated surfaces. As evident from FIG. 16, the effect of disinfectants on the removal of the antimicrobial coating is minimal.

Example 11: Antimicrobial Efficacy of Coatings

The relationship between $_{14}$Si photon counts from XRF spectra and residual antimicrobial activity of a coating was evaluated using a modified version of an existing sanitization protocol (ASTM-E1153) for hard surfaces using *Staphylococcus epidermidis* (ATCC 12228) as the test organism. Treated and untreated control coupons were inoculated with 1×10$^6$ cfu/mL *S. epidermidis* and held at room temperature for a contact time of 2 hours. After completion of the contact time, carriers were immediately placed into 20 mL of D/E neutralizer broth (Hardy Diagnostics) and vortexed for 30 seconds. Dilutions of each coupon were plated in duplicate using the pour plate method with Tryptic Soy Agar (TSA, BD Biosciences). Plates were incubated at 37° C. for 36-48 hours; after incubation, plates with 30-300 colonies were counted and the cfu/carrier was calculated. The cfu/carrier values were used to determine the log$_{10}$ reduction for each coupon versus the untreated (2 hour) control. A total of 4 coupons were tested per weight from two independent experiments.

To produce a curve of efficacy versus weight of antimicrobial coating, the $_{14}$Si photon counts were converted to the corresponding weight of coating in mg/in$^2$ using the calibration curve. The results of the efficacy experiments are shown in FIG. 17 as a plot of log$_{10}$ reduction of *Staphylococcus epidermidis* (ATCC 12228) versus coating weight in mg/in$^2$. the relationship between XRF values and antimicrobial efficacy were found to be well-correlated with a logarithmic trend ($R^2$=0.9308).

The trend reveals a sharp increase in antimicrobial activity after formation of initial coating layers (low coating weight), and the addition of more layers does not have an additive impact on efficacy. This observation is aligned with various possible mechanisms of action of such coatings, where only the exposed outermost layer is in contact with organisms. Increasing the thickness of the coating does not increase the surface area with a linear rate, which explains the observed plateau in the rate of antimicrobial activity.

This final calibration curve allows one to take the XRF analyzer into the field, such as into a hospital, where surfaces have been coated with the antimicrobial coating, and instantly determine the expected antimicrobial efficacy remaining on a coated surface. A determination of expected antimicrobial efficacy is more important than just a thickness/weight determination since the expected antimicrobial efficacy is also dependent on the organisms that might be inoculated onto a coated surface, such as by touching, and not just the amount of antimicrobial coating on the surface. As a hypothetical example, the same remaining weight/in$^2$ of silane or silane/titanium coating on a surface may provide a 5-log kill of *E. coli* but only a 3-log kill of *S. epidermidis*. Software programming on the XRF analyzer may incorporate a calibration curve obtained for each organism such that the user of the XRF analyzer need only select the organism, take an XRF $_{14}$Si photon count reading from the coating on the surface, and look at a display screen on the analyzer or on a supporting computer to see the antimicrobial efficacy expected for the coating for this chosen pathogen. In this way, the staff in the hospital can quickly determine which surfaces to recoat with antimicrobial coating composition.

These findings show that the use of a handheld XRF analyzer provides a rapid and cost-effective method for assessing the presence and efficacy of antimicrobial coatings on various substrate surfaces.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

We claim:

1. A method of estimating an expected level of residual antimicrobial efficacy for an antimicrobial coating comprising silicon and/or titanium, the method comprising:
    obtaining $_{14}$Si or $_{22}$Ti photon counts from the antimicrobial coating using XRF spectroscopy; and converting the obtained $_{14}$Si or $_{22}$Ti photon counts to the expected level of residual antimicrobial efficacy using a calibration curve.

2. The method of claim 1, wherein the antimicrobial coating comprises a silane selected from the group consisting of 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropyl silanetriol, 3-aminopropyltrimethoxysilane, 3-aminopropyltriethoxysilane, 3-aminopropyl silanetriol, homopolymers therefrom, and mixtures thereof.

3. The method of claim 1, wherein the antimicrobial coating comprises nanoparticulate $TiO_2$.

4. The method of claim 1, wherein the step of obtaining the $_{14}$Si or $_{22}$Ti photon counts comprises irradiation of the antimicrobial coating with X-rays emanating from a hand-held XRF analyzer and detecting X-ray emissions from the coating.

5. The method of claim 1, wherein the calibration curve comprises an x/y plot of the expected level of residual antimicrobial efficacy for a desired microorganism versus the $_{14}$Si or $_{22}$Ti photon counts.

6. A method of measuring a thickness of an antimicrobial coating comprising silicon and/or titanium on an environmental surface, the method comprising:
    obtaining initial $_{14}$Si or $_{22}$Ti photon counts from the antimicrobial coating using XRF spectroscopy;
    subjecting the antimicrobial coating to mechanical abrasion;
    obtaining $_{14}$Si or $_{22}$Ti photon counts from the antimicrobial coating after mechanical abrasion using XRF spectroscopy; and
    converting the obtained $_{14}$Si or $_{22}$Ti photon counts to the thickness of the antimicrobial coating after mechanical abrasion using a calibration curve,
    wherein the mechanical abrasion correlates to handling of the environmental surface.

7. The method of claim 6, wherein the antimicrobial coating comprises an organosilane selected from the group consisting of 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropyl silanetriol, 3-aminopropyltrimethoxysilane, 3-aminopropyltriethoxysilane, 3-aminopropyl silanetriol, homopolymers therefrom, and mixtures thereof.

8. The method of claim 6, wherein the antimicrobial coating comprises nanoparticulate $TiO_2$.

9. The method of claim 6, wherein the step of obtaining the $_{14}$Si or $_{22}$Ti photon counts comprises irradiation of the antimicrobial coating with X-rays emanating from a hand-held XRF analyzer and detecting X-ray emissions from the coating.

10. The method of claim 6, wherein the calibration curve comprises an x/y plot of antimicrobial coating thickness versus $_{14}$Si or $_{22}$Ti photon counts.

11. A method of measuring a weight per unit of surface area of an antimicrobial coating comprising silicon and/or titanium on an environmental surface, the method comprising:
    obtaining initial $_{14}$Si or $_{22}$Ti photon counts from the antimicrobial coating using XRF spectroscopy;
    subjecting the antimicrobial coating to mechanical abrasion;
    obtaining $_{14}$Si or $_{22}$Ti photon counts from the antimicrobial coating after mechanical abrasion using XRF spectroscopy; and
    converting the obtained $_{14}$Si or $_{22}$Ti photon counts to the weight per unit of surface area of the antimicrobial coating after mechanical abrasion using a calibration curve,
    wherein the mechanical abrasion correlates to handling of the environmental surface.

12. The method of claim 11, wherein the antimicrobial coating comprises an organosilane selected from the group consisting of 3-(trimethoxysilyl) propyl dimethyl octadecyl ammonium chloride, 3-(trihydroxysilyl) propyl dimethyl octadecyl ammonium chloride, 3-chloropropyltrimethoxysilane, 3-chloropropyltriethoxysilane, 3-chloropropylsilanetriol, 3-aminopropyltrimethoxysilane, 3-aminopropyltriethoxysilane, 3-aminopropyl silanetriol, homopolymers therefrom, and mixtures thereof.

13. The method of claim 11, wherein the antimicrobial coating comprises nanoparticulate $TiO_2$.

14. The method of claim 11, wherein the step of obtaining the $_{14}$Si or $_{22}$Ti photon counts comprises irradiation of the antimicrobial coating with X-rays emanating from a hand-held XRF analyzer and detecting X-ray emissions from the coating.

15. The method of claim 11, wherein the calibration curve comprises an x/y plot of weight per unit of surface area of the antimicrobial coating versus $_{14}$Si or $_{22}$Ti photon counts.

\* \* \* \* \*